United States Patent
Fischer et al.

(10) Patent No.: US 11,449,209 B2
(45) Date of Patent: Sep. 20, 2022

(54) AUTOMATICALLY POSITIONING OBJECTS IN THREE-DIMENSIONAL SPACE UTILIZING A WIDGET

(71) Applicant: Adobe Inc., San Jose, CA (US)

(72) Inventors: Alex Fischer, San Francisco, CA (US); Jeanette Mathews, San Francisco, CA (US); Fulvio Cervone, San Jose, CA (US); Erin Kim, Brooklyn, NY (US); Charles Pina, Oakland, CA (US); Grayson Squier Lang, San Francisco, CA (US)

(73) Assignee: Adobe Inc., San Jose, CA (US)

( * ) Notice: Subject to any disclaimer, the term of this patent is extended or adjusted under 35 U.S.C. 154(b) by 76 days.

(21) Appl. No.: 16/679,913

(22) Filed: Nov. 11, 2019

(65) Prior Publication Data
US 2021/0141514 A1     May 13, 2021

(51) Int. Cl.
*G06F 3/04845*     (2022.01)
*G06F 3/04815*     (2022.01)
(Continued)

(52) U.S. Cl.
CPC ...... *G06F 3/04845* (2013.01); *G06F 3/04815* (2013.01); *G06T 15/20* (2013.01);
(Continued)

(58) Field of Classification Search
CPC . G06F 3/04845; G06F 3/04815; G06T 15/20; G06T 19/20; G06T 2210/12; G06T 2219/2004
See application file for complete search history.

(56) References Cited

U.S. PATENT DOCUMENTS

| | | | | |
|---|---|---|---|---|
| 6,128,631 | A | * | 10/2000 | Wallace ............. G06F 3/04845 345/473 |
| 2016/0110077 | A1 | * | 4/2016 | Stone ................... G06F 3/0488 715/769 |

(Continued)

OTHER PUBLICATIONS

Adobe, "Responsive Resize", https://helpx.adobe.com/xd/help/using-responsive-resize.html, Jun. 19, 2019, accessed Nov. 11, 2019, 8 pages.

(Continued)

*Primary Examiner* — Jennifer N Welch
*Assistant Examiner* — Amy P Hoang
(74) *Attorney, Agent, or Firm* — Kilpatrick Townsend & Stockton LLP

(57) ABSTRACT

In a method, one or more processing devices perform operations. Such operations include receiving a signal to display a widget for one or more objects displayed in virtual space. The operations further include computing a bounding box for the one or more objects, the bounding box including a bottom section having a set of corners. The operations further include determining, from among the set of corners, a first corner and a second corner that are, respectively, closest and second closest to a virtual camera position. The operations further include generating the widget based on the bounding box, the first corner, and the second corner. The widget includes a first axis handle connected to a second axis handle at the first corner and further connected to a third axis handle at the second corner. The operations further include causing display of the widget along with the one or more objects.

19 Claims, 18 Drawing Sheets

(51) Int. Cl.
  *G06T 19/20* (2011.01)
  *G06T 15/20* (2011.01)
(52) U.S. Cl.
  CPC .......... *G06T 19/20* (2013.01); *G06T 2210/12* (2013.01); *G06T 2219/2004* (2013.01)

(56) References Cited

U.S. PATENT DOCUMENTS

2018/0113595 A1* 4/2018 Ptak .................... G06F 3/04815
2018/0114371 A1* 4/2018 Cullum ............... G06F 3/04845
2020/0089387 A1* 3/2020 Andersson .......... G06F 3/04847

OTHER PUBLICATIONS

Autodesk, "MAYA: Align objects", https://knowledge.autodesk.com/support/maya/learn-explore/caas/CloudHelp/cloudhelp/2018/ENU/Maya-Basics/files/GUID-8345A56F-C6E2-4D0B-BD1A-EC4E6D4B574D-htm.html, Aug. 13, 2018, accessed Nov. 11, 2019, 3 pages.
Autodesk, "Spacing Tool", https://knowledge.autodesk.com/support/3ds-max/learn-explore/caas/CloudHelp/cloudhelp/2019/ENU/3DSMax-Basics/files/GUID-D82476F1-FE3F-4B51-BC73-868B0A28281B-htm.html, Dec. 11, 2018, accessed Nov. 11, 2019, 7 pages.
Autodesk, "Spacing Tool" https://knowledge.autodesk.com/support/3ds-max/learn-explore/caas/CloudHelp/cloudhelp/2016/ENU/3DSMax/files/GUID-D82476F1-FE3F-4B51-BC73-868B0A28281B-htm.html, Feb. 8, 2016, accessed Nov. 11, 2019, 4 pages.

* cited by examiner

AUTOMATICALLY POSITIONING OBJECTS IN THREE-DIMENSIONAL SPACE UTILIZING A WIDGET

TECHNICAL FIELD

This disclosure generally relates to computer graphics. More specifically, but not by way of limitation, this disclosure relates to automatically positioning objects in three-dimensional space, particularly through automated repositioning facilitated by a widget that provides intuitive controls.

BACKGROUND

Various computer applications and programs offer functionality that allows a user to position objects in virtual space. For instance, computer-aided design (CAD) is a computer technology that aids a user in creating, modifying, or analyzing two- or three-dimensional models, where such a model can include one or more objects as parts. CAD systems can be used for various purposes, such as for designing mechanical objects as well as larger objects such as bridges and stadiums. The output of a CAD system can be used for machining, for reference when building a real-life object, or for other purposes. These computer applications and programs typically provide controls, such as widgets, as part of an interface that can be manipulated by the user to achieve a positioning operation. For example, a widget may be provided that enables a user to position multiple selected objects according to some positioning criterion (e.g., relative to one another). These controls may be used for positioning multiple two-dimensional (2D) objects in 2D virtual space, multiple three-dimensional (3D) objects in 3D virtual space, and the like. Examples of programs offering such controls or widgets include CAD programs, drawings programs, charting programs, image editors, text editors with graphical functionalities, and potentially others.

SUMMARY

In some embodiments, a method includes receiving a signal to display a widget. In one example, for instance, a user utilizes an application to manipulate objects. Through that application, the user requests generation of a widget, and thus, a signal is provided to generate and display the widget. The method further includes identifying one or more objects for which the widget is to be drawn, where such objects are positioned in a virtual space and displayed from a perspective of a virtual camera position. For instance, in the this example, the user selects the one or more objects from objects currently displayed by the application.

The method further includes, responsive to the signal, computing at least a portion of a bounding box for the one or more objects, where the bounding box includes a bottom section having a set of corners. From among that set of corners, a first corner that is closest to the virtual camera position and a second corner that is second closest to the virtual camera position are selected. The method further includes generating the widget based on the bounding box, the first corner, and the second corner. In the above example, a bounding box is computed for the objects selected by the user, and a widget is generated based on the bounding box as well as based on such closest corner and second closest corner of the bounding box.

In some embodiments, the widget includes a first axis handle, a second axis handle, and a third axis handle. In this example, the first axis handle corresponds to a first dimension of the virtual space, the second axis handle corresponds to a second dimension of the virtual space, and the third axis handle corresponds to a third dimension of the virtual space. Further, the first axis handle connect to the second axis handle at the first corner, and the first axis handle connects to the third axis handle at the second corner. The method may further include causing the widget to be displayed by an output device along with the one or more objects.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

DETAILED DESCRIPTION

Figure 1:
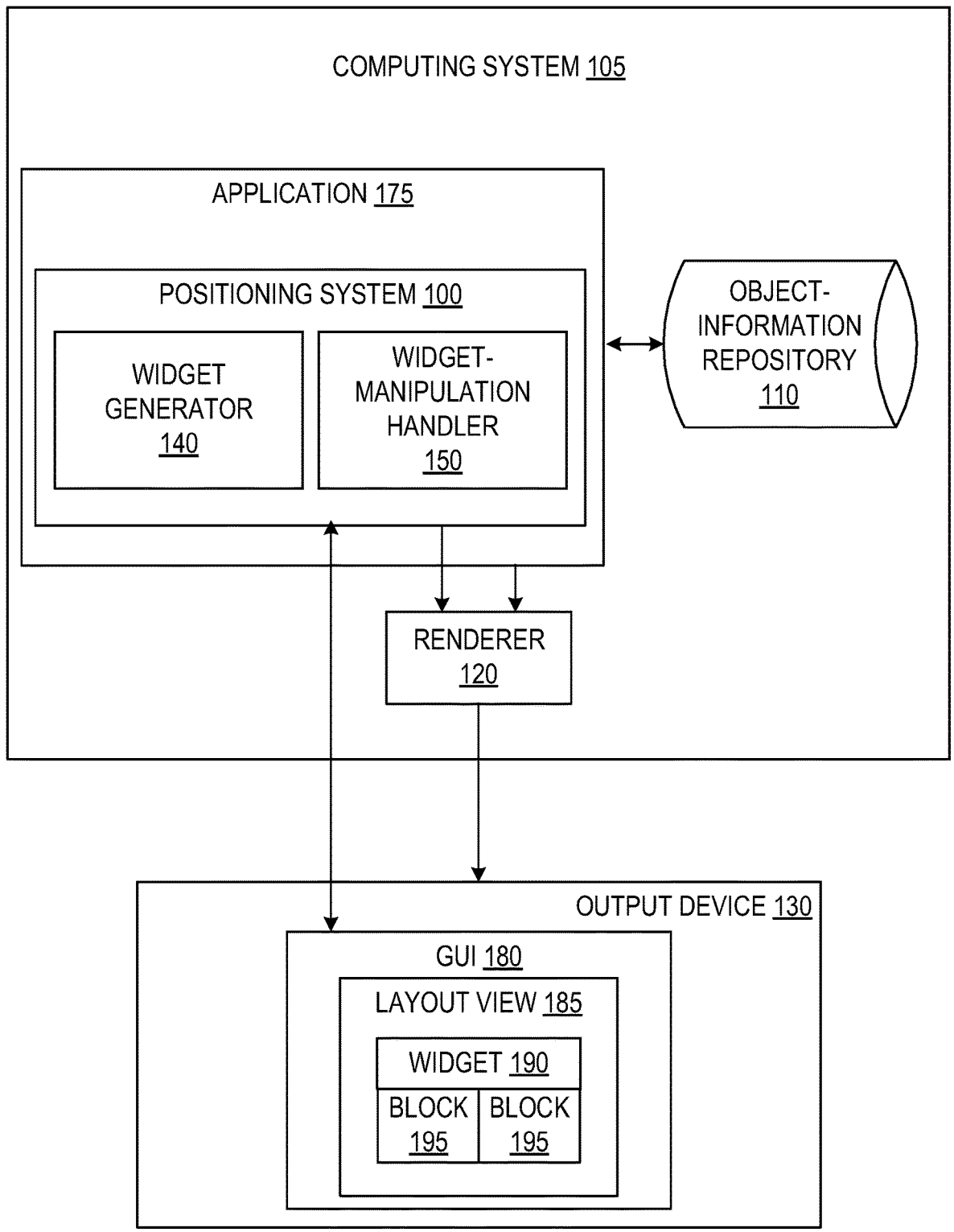
FIG. 1 depicts an example of a positioning system configured to generate and position virtual objects, according to certain embodiments.

The present disclosure includes techniques, systems, methods, and computer-program products for generating a widget based on a view of objects and, further, using the widget to automatically position (e.g., reposition) the objects in the virtual space, also referred to as the world space, of such objects. Certain embodiments described herein improve the technological field of computer graphics, including computer-aided design, by providing a novel widget in a beneficial orientation with handles arranged for intuitive use. Further, according to some embodiments, the widget is useable to automatically reposition objects in an intuitive manner. More specifically, improved controls such as widgets are described for controlling or manipulating the layout or positions of multiple objects, where the controls enable novel techniques and algorithms for aligning or distributing the positions of the objects. Embodiments of the widgets also provide a simple and intuitive interface for their use. The widgets can be used for positioning two-dimensional (2D) objects in 2D virtual space or three-dimensional (3D) objects in 3D virtual space. Positioning multiple objects can include using a widget to align the objects according to some alignment criteria or to distribute the objects within a certain 2D or 3D virtual space according to some distribution criteria.

Conventional systems provide tools, such as widgets, that lack intuitive features for positioning objects. Such controls are thus difficult to use and have limited capabilities. While these deficiencies exist when positioning 2D objects in a 2D virtual space, the deficiencies are exacerbated when positioning 3D objects in a 3D virtual space. In 3D virtual space, the perspective from which a 3D scene is rendered on a computer display adds a further complicating variable to the display and use of the widgets. For instance, due to various selectable handles of a conventional widget looking too similar, it is not always clear which handles correspond with which positioning commands. Further, automated distribution of objects throughout a space is often not performed in a desirable way; for instance, the automated distribution of objects can appear non-deterministic in some cases, causing a user to have to manually distribute objects when the automated tools do not behave as expected or desired.

For purposes of this disclosure, the objects whose positions can be controlled using the widgets described herein are digital or virtual objects that are generated by a computer system and can be displayed or otherwise output using an output device such as a monitor or display. In some instances, a digital object can represent a physical object, but this need not be the case. The objects in a set of multiple objects being positioned can be of the same shape or can have different shapes from one another. The dimensions (e.g., length, breadth, height) of such objects can be the same or different from one another.

An improved widget is provided that can be used by a user to manipulate and control the layout or positions of multiple objects. A user may select a set of multiple objects and then request the widget to be displayed. In certain embodiments, the placement or appearance of the widget takes into consideration (1) the dimensions of the selected objects, (2) the initial positions of the selected objects when the user requests the widget to be displayed, and (3) the perspective that is used to display the selected objects. For instance, in one embodiment, an intersection of a first axis handle and a second axis handle of the widget are positioned at a closest corner, relative to the virtual camera, of a bottom plane of a minimum bounding box of the objects. Further, an intersection of the first axis handle and a third axis handle is positioned at the second closest corner, to the virtual camera, of the bottom plane. Each axis handle corresponds to a respective dimension (e.g., of three dimensions in 3D virtual space) and extends for the length of the bounding box in that dimension. Further, an example of an axis handle includes a set of corresponding alignment handles, each of which may have a flattened teardrop shape having a surface perpendicular to the corresponding axis handle.

In certain embodiments, an axis handle spanning along an axis of the widget is targetable (e.g., selectable) to distribute the objects evenly in the corresponding dimension. Further, an alignment handle is targetable to align the objects to an alignment plane in which the surface of the teardrop shape of the alignment handle lies. Thus, the orientation and position of an alignment handle indicates how objects can be aligned through the use of such alignment handle. When a user repositions an alignment handle to change the length of an axis handle, thus extending the bounding box on which the length of the axis handle is based, the objects are repositioned based on the updated length of the bounding box. Even when the objects are initially aligned in one, two, or three dimensions (e.g., the objects overlap one another completely), an embodiment determines how to separate and position the objects to distribute them across the updated length of the bounding box. These and other features of some embodiments are described below in more detail.

The following non-limiting example is provided to introduce certain embodiments. In this example, a positioning system is configured to provide a widget in layout view (i.e., an interface in which a view of the objects is shown) and to reposition objects in the layout view based on interactions with the widget. In this example, the positioning system is integrated with an application, such as a CAD application or other application that enables the manipulation of virtual objects, being used to design the interior of a vehicle. As part of the application, the positioning system generates objects, such as air conditioning vents, a navigation display, audio controls, a windshield, as well as others, positioned in three-dimensional virtual space representing the vehicle interior, such that a view of the objects is from the perspective of a virtual camera position. In this case, the objects were previously defined, and a user is now trying to position the objects in a logical and aesthetically pleasing arrangement.

The user requests that a widget be generated as a tool for the user in manipulating the objects. Responsive to this request, the positioning system computes a three-dimensional bounding box of the objects, specifically, for instance, a minimum bounding box such that each face of the bounding box touches at least one of the objects. The bounding box includes a set of corners, specifically, for instance, eight corners. From among the four corners of the bottom plane of the bounding box, the positioning system determines the closest corner to the virtual camera position and the second closest corner to the virtual camera position. The positioning system generates a widget having a first axis handle corresponding to a first dimension (e.g., the X dimension) and a second axis handle corresponding to a second dimension (e.g., the Y dimension), such that the first axis handle and the second axis handle meet at the closest corner and together form a pair of axes, and having a third axis handle corresponding to a third dimension (e.g., the Z dimension), such that the first axis handle and the third axis handle meet at the second closest corner and together form another pair of axes. The design subsystem displays the widget responsive to the user's request for the widget.

The widget enables the user to intuitively provide instructions to automatically position (e.g., reposition) the objects. For example, extending the length of an axis handle representing a dimension causes the objects to be automatically redistributed in the dimension corresponding to the axis handle, specifically, spread out along an updated length of the axis handle as extended. In this case, to determine an updated position for each object, the positioning system utilizes a first technique based on the centroids of the objects or a second technique based on a spacing ratio between the objects. For another example, selecting an axis handle causes the objects to be evenly distributed in the corresponding dimension. Further, an embodiment of the widget includes one or more alignment handles extending from an axis handle. An example of an alignment handle has a flattened teardrop shape angled perpendicularly to the corresponding axis handle. When the user selects the alignment handle, the positioning system automatically repositions the objects to align an edge of each object to an alignment plane corresponding to the angle of the alignment handle. Thus, the orientation of alignment handle indicates the alignment plane corresponding to the alignment handle. It is thus intuitive for the user to associate the alignment handle with the alignment plane, given the orientations of the alignment handle. Various other features of the widget and techniques for positioning objects are described herein.

Certain embodiments described herein facilitate digitally positioning two-dimensional or three-dimensional objects by utilizing a widget having features designed to feel intuitive to a user so as to enable effective manipulation of the objects. Embodiments represent an improvement in the field of computer graphics, such as computer-aided design, due to characteristics of the widget as described herein, as well as due to techniques for positioning objects automatically to enable a user to position and otherwise manipulate objects more efficiently. In certain embodiments, the widget enables a user to distribute objects using a variety of distribution techniques, even when lacking information regarding the ordering of objects in a dimension in which the objects are being distributed. Further, certain embodiments described herein use a rules-based technique to determine where to position objects, based in part on use of the widget. For instance, if an alignment handle of the widget is dragged to enlarge the widget in a dimension, then objects may be distributed along the updated length of the widget in that dimension. The specific distribution of such objects could be determined based on a mode selection. For instance, if a first mode is selected, then the objects are distributed to maintain a ratio of distances between the centroid of each object and a first object, whereas if a second mode is selected, then the objects are distributed to maintain a ratio of spacing between objects. Further, various rules are utilized to determine how to distribute objects in a dimension where the positioning system is missing information about how to distribute such objects.

Further, an embodiment of the positioning system provides a novel widget with axis handles positioned based on a camera perspective, and further, the widget retains its position relative to objects in the virtual space even as the camera perspective changes. This provides an intuitive usefulness to the user because the widget acts as a frame of reference in that the widget remains in place relative to the objects, rather than moving dynamically with the camera perspective as is conventionally done. Further, the teardrop shape of alignment handles in some embodiments of the widget provides a reference for an alignment plane, illustrating for the user how objects will be aligned through the use of such alignment handles. Thus, due to the specific structure of the widget acting as a user interface, the positioning system enables a user to more effectively manipulate objects, leading to more efficient digital design.

Referring now to the drawings, FIG. 1 depicts an example of a computing system 105 incorporating a positioning system 100 according to certain embodiments. The directions of the various arrows shown in FIG. 1 illustrate an example communications flow; however, these directional arrows are provided for illustrative purposes only and do not limit the various embodiments described herein. The positioning system 100 provides one or more controls, such as a widget 190, for modifying objects 195. An embodiment of the widget 190 enables controlling or manipulating objects 195 (i.e., virtual objects), which may be displayed in a layout view 185 of a graphical user interface (GUI) 180, according to certain embodiments. For instance, an embodiment of the positioning system 100 is integrated with an application 175, such as a computer-aided design (CAD) application, a drawing application, or some other application in which objects 195 can be manipulated. In that case, the layout view 185 may be part of the GUI 180 of the application 175, as shown in the example of FIG. 1.

The embodiment depicted in FIG. 1 is merely an example and is not intended to unduly limit the scope of claimed embodiments. One of ordinary skill in the art would recognize many possible variations, alternatives, and modifications. For example, in some implementations, more or fewer systems or components than those shown in FIG. 1 may be provided, two or more systems or components may be combined, or a different configuration or arrangement of systems and components may be provided. The systems, subsystems, and other components depicted in FIG. 1 may be implemented in software (e.g., program code or instructions) executed by one or more processing units (e.g., processors, cores), in hardware (e.g., as a specialized hardware circuit installed on the computing system 105), or combinations thereof. The software may be stored on a non-transitory storage medium such as memory device.

For example, in the embodiment depicted in FIG. 1, the positioning system 100 runs on the computing system 105. In alternative embodiments, the positioning system 100 may run on a distributed system of computing devices. For example, the positioning system 100 may be implemented by one or more computing systems of a cloud service provider infrastructure. The computing system 105 can be of various types including but not limited to a consumer device such as a desktop computer, a notebook computer, a tablet, or a smartphone. The positioning system 100 may be implemented as program code installed on such a consumer device.

As shown in FIG. 1, an embodiment of the positioning system 100 is integrated into an application 175 running on the computing system 105. Additionally or alternatively, however, the positioning system 100 is separate from the application 175 but in communication with the application 175 to provide the operations described herein through the application 175. The computing system 105 further includes, or otherwise utilizes, an object-information repository 110 and a renderer 120, both of which are used by the positioning system 100 in some embodiments.

The object-information repository 110 is, for example, a database, one or more tables of a database, one or more text files, or one or more other storage objects. For instance, the object-information repository 110 may be a portion of a storage device of the computing system 105. As stored in the object-information repository 110, a definition of an object 195 could take various forms. Such a definition describes, for instance, the size, shape, and position of a corresponding object 195. For instance, each object 195 is represented as a definition in the form of a data structure or a row in a table. In one example, if an object 195 is a polyhedron, such as a rectangle, then the object 195 is stored as one or more ordered sets of vertices, each set defining a face of the polyhedron. In another example, if the object 195 is not a polyhedron but a more complex shape, then the object 195 is stored as one or more functions (e.g., parametric functions) or as one or more sets of arcs and segments. It will be understood that various techniques for storing definitions of objects 195 are within the scope of this disclosure.

In some embodiments, the renderer 120 identifies a representation of the layout view 185, including various objects 195 shown in the layout view 185, and the renderer generates and outputs a display of such layout view 185. For instance, the renderer 120 renders the layout view 185 to an output device 130, such as a printer, a display monitor, or a network device such that the layout view 185 can be displayed on a remote device. Generally, in some embodiments, if the position system 100 generates or modifies an object 195 or otherwise modifies the layout view 185, such as by generating a widget 190 in the layout view 185, the renderer 120 renders (i.e., generates a display of) the layout view 185 as updated. In one embodiment, the renderer 120 is or utilizes a GPU installed on the computing system 105. For instance, to utilize the renderer 120, the position system 100 or other aspect of the application 175 sends to the GPU a set of commands for displaying the layout view 185 on a display monitor or elsewhere, and the GPU follows the commands to generate a display of the layout view 185.

The output device 130 can take various forms. For instance, the output device 130 is a printer or display monitor, or the output device 130 is a separate computing device, such as a smartphone, tablet, or personal computer, with which the computing system 105 communicates to display the GUI 180 on such separate computing device. In one embodiment, for instance, the computing system 105 on which the position system 100 runs provides a cloud-based service, and the output device 130 is a consumer device utilizing the cloud-based service such that the computing system 105 causes such consumer device to display the layout view 185 including various objects 195.

As shown in FIG. 1, an embodiment of the positioning system 100 includes a widget generator 140 and a widget-manipulation handler 150. Generally, the widget generator 140 generates a widget 190 in the layout view 185, and the widget-manipulation handler 150 receives a user input in the form of an interaction with the widget 190 and maps that interaction to a positioning action. When an object 195 is modified, such as based on application of a positioning action, the position system 100 or other aspect of the application 175 stores an updated version of the definition of the object 195 back to the object-information repository 110.

In some embodiments, the positioning system 100 enables a user to manipulate objects 195. An embodiment of the application 175 generates a layout view 185, as part of the GUI 180 of the application 175, such that the layout view 185 acts as a user interface in which the user can manipulate the objects 195. The application 175 enables the user to add an object 195 to the layout view 185 in various ways. In one example, the user requests that the application 175 open an existing file, where that file defines the object 195. For instance, that file could be a portion of the object-information repository 110. The application 175 reads a definition of the object 195 as stored in the file and thus generates a representation of the object 195 in the layout view 185. In another example, the user manually provides a definition of the object 195, such as by drawing the object 195 and thus providing a data input indicating the object 195. In that case, the application 175 interprets the data input as an object definition (i.e., the definition of an object 195) and stores such object definition in the object-information repository 110.

In some embodiments, the widget generator 140 is configured to generate the widget 190 in the layout view 185. The user can then interact with the widget 190 to perform certain operations (i.e., positioning actions) on the objects 195 in the layout view 185. An example of the widget generator 140 receives from the user a request to view a widget 190, and responsive to that request, the widget generator 140 determines a location in the layout view 185 for the widget 190, based on characteristics (e.g., the sizes and shapes) of the objects 195 in the layout view 185, and generates a widget 190. Aspects of the widget 190 will be described in more detail below.

An embodiment of the position system 100 enables the user to utilize the widget 190 to modify objects 195, such as to position (e.g., repositioning) or otherwise manipulate objects 195. To this end, the positioning system 100 maintains a mapping of interactions to positioning actions, such that positioning actions are applicable to objects 195 to modify such objects 195, and the widget-manipulation handler 150 accesses such mapping. More specifically, each interaction with the widget 190 maps to a positioning action, which tells the widget-manipulation handler 150 how to modify the objects 195 responsive to the interaction. For instance, if a user drags (e.g., by touching and dragging on a touchscreen display or by clicking and dragging with a computer mouse) a handle of the widget 190 to enlarge the widget 190, the widget-manipulation handler 150 interprets this user input in the form of an interaction (i.e., an interaction with the widget 190) as a request to distribute the objects 195 over the updated length of the widget 190. Thus, the user can request modification of an object 195 (e.g., the position of an object 195) through use of the widget 190, and the widget-manipulation handler 150 interprets the request and modifies the object 195 as requested. One of skill in the art will understand that various types of interactions can be mapped to various positon actions, which can be applied to objects 195 to modify such objects 195. When an object 195 is modified, the application 175 updates the definition of the object 195 in the object-information repository 110 (e.g., in the file that maintains the definition of the object 195), and the renderer 120 renders an updated version of the layout view 185.

Figure 2:
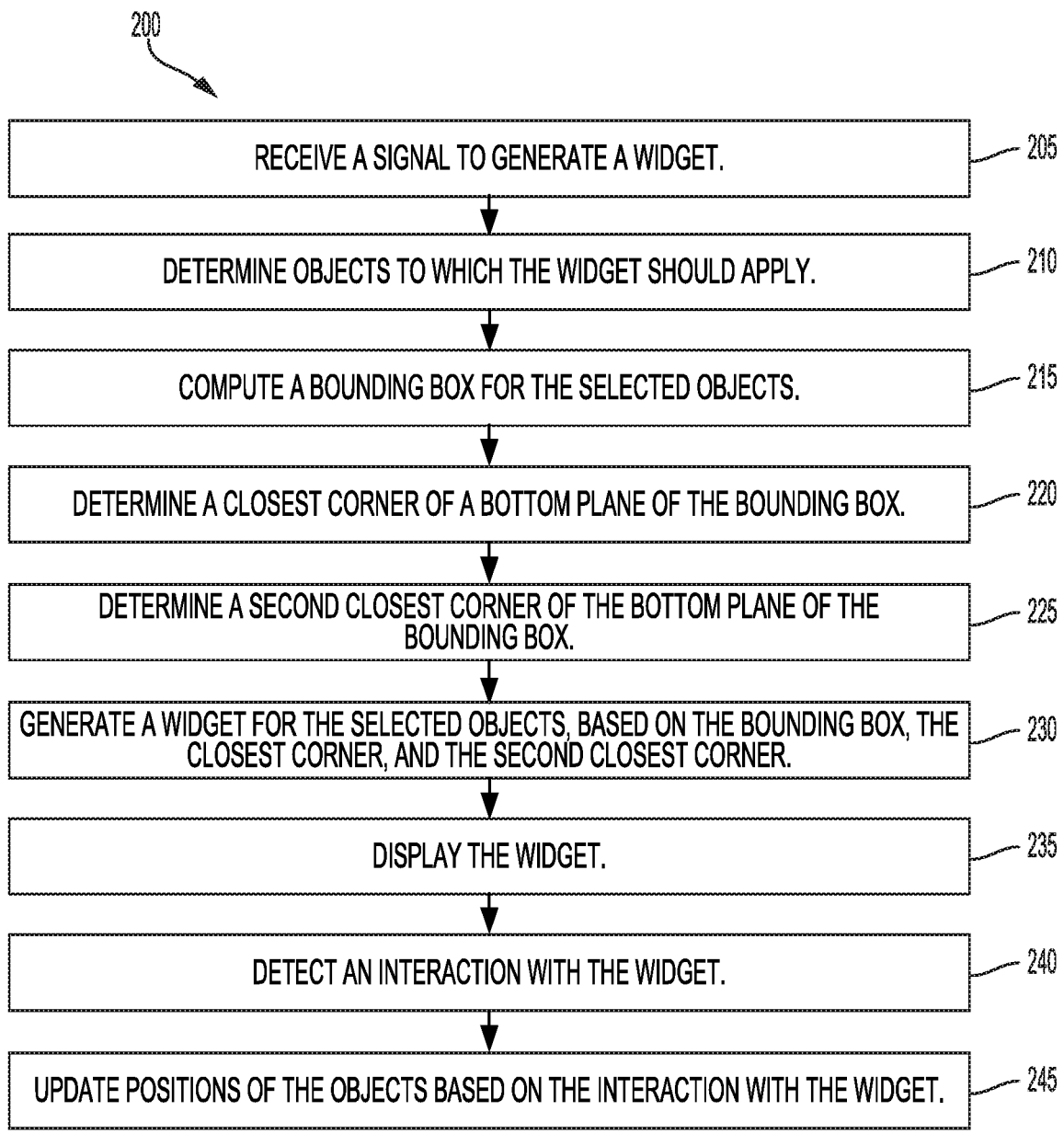
FIG. 2 depicts an example of a process for generating a widget useable to position objects of the positioning system, according to certain embodiments.

FIG. 2 depicts an example of a process 200 for generating a widget 190 useable to position objects 195 according to certain embodiments. The process 200 depicted in FIG. 2 may be implemented in software (e.g., code, instructions, program) executed by one or more processing units (e.g., processors, cores) of the computer system, implemented in hardware, or combinations thereof. The software may be stored on a non-transitory storage medium (e.g., on a memory device). The process 200 presented in FIG. 2 and described below is intended to be illustrative and non-limiting. Although FIG. 2 depicts various processing operations occurring in a particular sequence or order, this is not intended to be limiting. In certain alternative embodiments, the processing may be performed in some different order or some operations may also be performed in parallel. In certain embodiments, such as in the embodiment depicted in FIG. 1, the process 200 depicted in FIG. 2 may be performed by the positioning system 100 or, more specifically, by widget generator 140 in cooperation with other systems and components.

In some embodiments, prior to execution of this process 200, one or more objects 195 are shown in the layout view 185. The process 200 depicted in FIG. 2 is triggered, when, at block 205, a signal is received to display a widget 190. The signal may be received in response to a user selecting an option (e.g., a button, a drop-down, etc.) to request display of the widget 190.

At block 210, the one or more objects 195 for which the widget 190 is to be displayed are determined. In some embodiments, the one or more objects 195 may have been specifically selected by a user. Various different ways may be provided for the user to select the objects 195. For example, if the objects 195 are displayed via a touchscreen, the user may select one or more of the displayed objects 195 by touching the objects 195 via the touchscreen using a selection device (e.g., the user's finger or stylus). In another instance, the user may have selected the one or more objects 195 using a computer mouse or other such selection device. In yet other instances, other modalities (e.g., using voice inputs) may also be provided that enable a user to select the one or more objects 195. Information regarding these selections may be provided to the positioning system 100, and this information may be used by the widget generator 140 to determine the selected objects 195. In some implementations, if the user has not explicitly selected an object 195 displayed in the GUI 180, then all the objects 195 displayed in the GUI 180 may be deemed as selected in block 210. In yet other embodiments, if upon receiving the signal in block 205, it is determined that the user has not selected any object 195, then the user may be prompted to make object selections. In response to the prompt, the user may then make the desired selections, and such user selections are identified in block 210.

Figure 3:
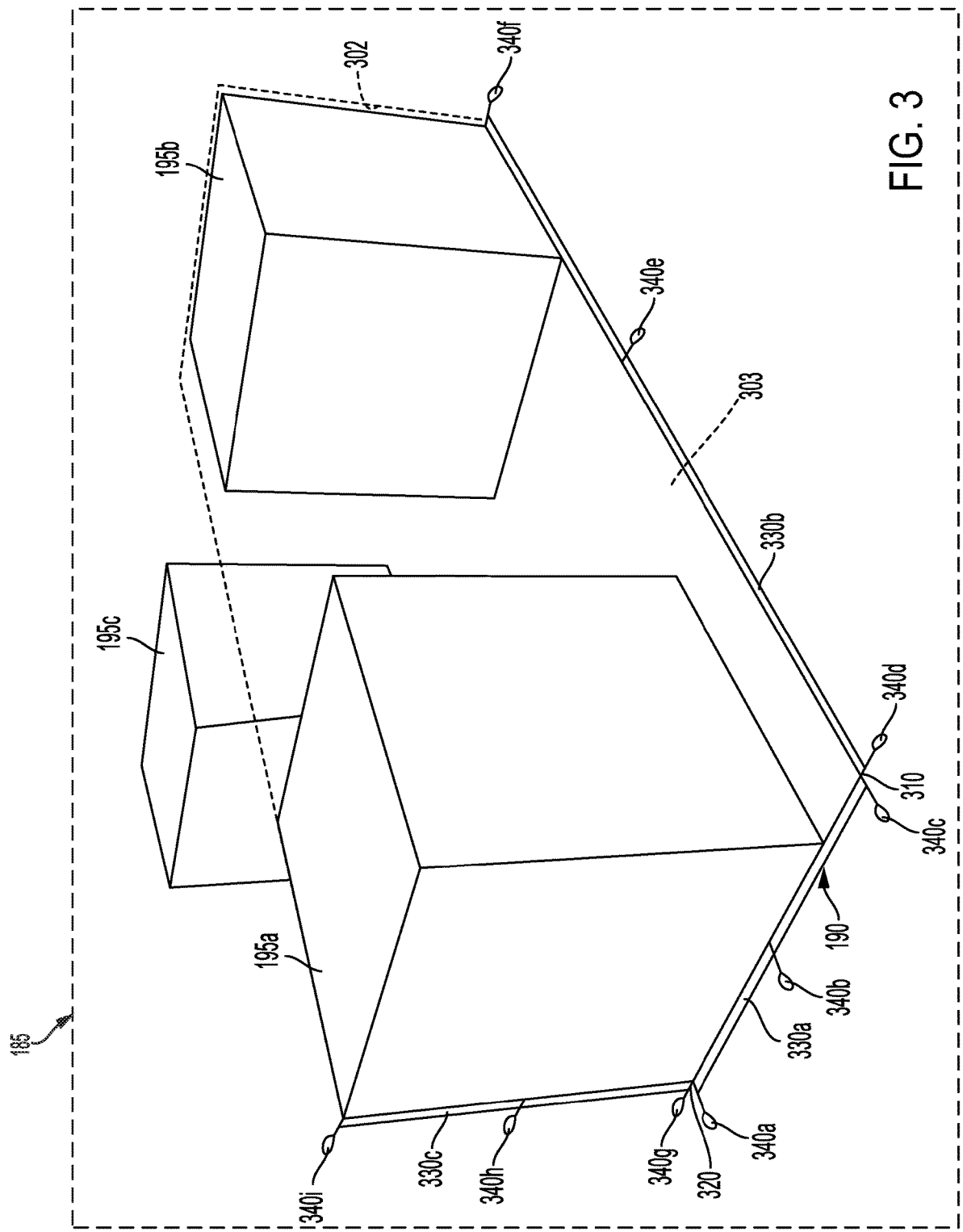
FIG. 3 depicts a layout view including a widget useable to position objects of the positioning system, according to certain embodiments.

FIG. 3 depicts a layout view 185 including a widget 190 useable to position objects 195 in a positioning system 100, according to certain embodiments. In some embodiments, the layout view 185 as shown by an output device 130 is rendered from a perspective of a virtual camera having a particular virtual camera position. It will be understood that the objects 195 are moveable within the virtual space in which such objects 195 reside and viewed from the perspective of the virtual camera. Thus, if the virtual camera moves, the layout view 185 changes due to a change in perspective, even if the objects 195 themselves do not move in the virtual space. Analogously, the positioning system 100 could move the objects 195 in the virtual space (e.g., responsive to an interaction with the widget 190), even if the virtual camera stays stationary, in which case the layout view 185 provided on the output device 130 would show that the objects 195 have moved.

In the example of FIG. 3, the layout view 185 includes three objects 195, specifically, a first object 195a, a second object 195b, and a third object 195c. Prior to requesting generation of the widget 190, the user selected the first object 195a and the second object 195b, but not the third object 195c. Thus, when the user requests the widget 190, an embodiment of the widget generator 140 generates a widget 190 applicable to only the first object 195a and the second object 195b. Thus, as shown in FIG. 3, the third object 195c is positioned outside of the widget 190 because the widget 190 was generated based on the first object 195a and the second object 195b but not based on the third object 195c.

In some embodiments, as described below in more detail, the widget 190 is applicable only to such selected objects 195. Thus, after generation of the widget 190, if an interaction with the widget 190 is mapped to a positioning action, the widget-manipulation handler 150 applies such positioning action only to the objects 195 to which the widget 190 applies.

Returning to FIG. 2, at block 215, a bounding box 302 is computed for the objects 195 identified as being selected in block 210. Generally, a bounding box is a box (e.g., a rectangle or a rectangular prism) having a number of dimensions equal to the number of dimensions of the virtual space and fully containing the objects 195 selected. In 3D space (i.e., 3D virtual space), an example of a bounding box is a rectangular prism that fully contains all such objects 195. In some embodiments, the widget generator 140 computes a minimum bounding box at this block 215. In that case, an example of the bounding box includes a set of faces (e.g., six faces), each of which contacts at least one object 195, such that the bounding box is the smallest possible bounding box (i.e., has the smallest volume) of all polyhedrons capable of fully containing the selected objects 195. However, embodiments are not restricted to a minimum bounding box, and thus, a larger bounding box could be used.

In some embodiments, a full bounding box is computed in block 215, including each corner of the bounding box 302 (e.g., all six corners in the case of a rectangular prism). In certain embodiments, however, only a portion of the bounding box, such as the bottom plane 303 of the bounding box, is computed in block 215. Various techniques are known in the art for computing a bounding box for a set of objects, and one or more of such techniques may be used in block 215. For the embodiment depicted in FIG. 1, the bounding box may be generated by widget generator 140 of positioning system 100.

Referring again to the example depicted in FIG. 3, a bounding box 302 is generated for the selected objects 195a and 195b. As shown in FIG. 3, both the selected objects fit within the bounding box, and the third object 195c, which is not selected, is permitted to fall outside the bounding box 302. In some embodiments, the bounding box 302 is generated independent of any objects 195 that are not selected (e.g., the third object 195c), and thus such objects 195 could fall inside or outside the bounding box 302.

At block 220 of the process 200 shown in FIG. 2, from among the set of corners of a bottom plane 303 (i.e., the bottom "section" in geometrical terms) of the bounding box 302 generated in block 215, a closest corner to the virtual camera is determined. At block 225, from among the set of corners of the bottom plane 303 of the bounding box 302 generated in block 215, a second closest corner 320 to the virtual camera is determined. For instance, in FIG. 3, a first corner is identified as the closest corner 310 of the bottom plane 303 of the bounding box 302 in block 220, and a second corner is identified as the second closest corner 320 in block 225.

At block 230 of the process 200 shown in FIG. 2, a widget 190 is generated based on the bounding box 302 generated in block 215 and, specifically, based on closest corner 310 determined in block 220, and the second closest corner 320 determined in block 225. In some embodiments, the widget generator 140 generates the widget 190 in block 230.

FIG. 3 illustrates an example of such a widget 190, which may be generated, for example, by the widget generator 140. As shown in FIG. 3, an embodiment of the widget 190 includes one axis handle per dimension of the virtual space, with each axis handle corresponding to a respective dimension (e.g., X, Y, or Z). For instance, in 3D space, an embodiment of the widget 190 includes three axis handles, specifically, a first axis handle 330a, a second axis handle 330b, and a third axis handle 330c. For example, in FIG. 3, the objects 195 reside in 3D space having three (e.g., X, Y, and Z) axes, and thus the widget 190 comprises a first axis handle 330a corresponding to the X axis, a second axis handle 330b corresponding to the Y axis, and a third axis handle 330c corresponding to the Z axis of the virtual space. More generally, the widget 190 includes an axis handle corresponding to each dimension of the virtual space.

In the example of the widget 190 depicted in FIG. 3, the first axis handle 330a intersects with the second axis handle 330b at the closest corner 310 and intersects with the third axis handle 330c at the second closest corner 320. More specifically, for instance, the first axis handle corresponding to the X axis intersects with the second axis handle corresponding to the Y axis at the closest corner 310 and intersects the third axis handle corresponding to the Z axis at the second closest corner 320. Thus, a pair of axes (e.g., the X axis and the Y axis) intersect at the closest corner 310, and another pair of axes (e.g., the X axis and the Z axis) intersect at the second closest corner 320. Further, in an embodiment of the widget 190, the first axis handle 330a intersects the second axis handle 330b at a right angle, and thus the first axis handle 330a and the second axis handle 330b are perpendicular and intersect only at the closest corner 310, and further, the first axis handle 330a intersects the third axis handle 330c at a right angle, and thus the first axis handle 330a and the third axis handle 330c are perpendicular and intersect only at the second closest corner 320.

In some embodiments, the lengths of the axis handles are determined based on the bounding box 302. For instance, as shown in FIG. 3, the second axis handle 330b begins at its intersection with the first axis handle 330a and extends (e.g., in a straight line) to the end of the bounding box 302. Thus, the length of the second axis handle 330b equals, or is otherwise based on, the length of the bounding box 302 in the corresponding dimension. Similarly, the third axis handle 330c begins at its intersection with the first axis handle 330a and extends (e.g., in a straight line) to the end (e.g., the top) of the bounding box 302. Thus, the length of the third axis handle 330c equals, or is otherwise based on, the length of the bounding box 302 in the corresponding dimension. The first axis handle extends (e.g., in a straight line) for the length of bounding box 302 between its intersection with the second axis handle 330b and its intersection with the third axis handle 330c. Thus, the length of the first axis handle 330a equals, or is otherwise based on, the length of the bounding box 302 in the corresponding dimension. It will be understood, however, that these lengths are provided for illustrative purposes only and that lengths other than those described above are within the scope of this disclosure.

In some embodiments, the placement of the axis handles and the intersections between axis handles are designed to be useful to a user. For instance, the closest corner 310 and the second closest corner 320 of the bottom plane 303 of the bounding box 302 are typically visible from the virtual camera position, and further, the use of two corners of the bounding box 302, particularly a minimum or near-minimum bounding box 302, ensures that the widget 190 is positioned proximate to the objects 195 for which the widget 190 is being generated and thus provides an intuitive way to interact with such objects 195.

In addition to the axis handles, other parts of the widget 190 are also generated in block 230 of the process 200 of FIG. 2 in some embodiments. For example, the widget 190 includes a respective set of alignment handles along each of the axis handles. These alignment handles are generated in block 230 and associated with the respective axis handles of the widget 190. In some embodiments, a respective set of alignment handles is generated in contact with, or proximate to, each axis handle. Each axis handle may have one or more associated alignment handles. For instance, in the example of FIG. 3, a first set of alignment handles 340a, 340b, and 340c is associated with a first axis handle 330a, a second set of alignment handles 340d, 340e, and 340f is associated with a second axis handle 330b, and a third set of alignment handles 340g, 340h, and 340i is associated with a third axis handle 330c. In this example, each axis handle has three alignment handles. In one embodiment, as shown, a first alignment handle 340d of an axis handle 330b is positioned at one end of the axis handle 330b (e.g., at the intersection of the axis handle 330b with another axis handle 330a), a third alignment handle 340f is positioned at the other end of the axis handle 330b (e.g., at the point on the axis handle 330b that is farthest from the first alignment handle 340d), and a second alignment handle 340e is positioned on the axis handle 330b between the first alignment handle 340d and the third alignment handle 340f (e.g., equidistant from the first alignment handle 340d and the third alignment handle 340f).

In some embodiments, each alignment handle has a teardrop shape, a loop shape, an elliptical shape, or some other shape. As shown in FIG. 1, an example of an alignment handle further includes a segment that connects such shape to the respective point on the axis handle. The shape of an alignment handle, whether teardrop-shaped or otherwise, has a surface in a plane perpendicular to the corresponding axis handle in the virtual space. Thus, the teardrop shape is perpendicular to the axis handle. Because each alignment handle in the set of alignment handles corresponding to an axis handle is perpendicular to the axis handle, each such alignment handle is parallel to other alignment handles in the set corresponding to that axis handle. Further, because each axis handle in some embodiments is perpendicular to each other axis handle, each set of alignment handles of each axis handle is perpendicular to the alignment handles corresponding to the other axis handles.

At block 235 of the process 200 of FIG. 2, the widget 190 generated in block 230 is displayed in the layout view 185 displaying the selected objects. For the embodiment depicted in FIG. 1, information related to the widget 190 generated by widget generator 140 is communicated to renderer 120, which then causes the widget 190 to be displayed by the output device 130 alongside the displayed objects 195 in the layout view 185.

Once the widget 190 is displayed, the user can use the widget 190 to control or manipulate the positions of the selected objects 195. The user can do this by interacting with different parts of the widget 190, such as by interacting with one or more axis handles or by interacting with one or more alignment handles. Different modalities may be provided for the user to interact with the widget 190. For instance, if the objects and the widget 190 are displayed using a touchscreen, the user may use a selection device (e.g., the user's finger, a stylus) to interact directly with the widget 190 via the touchscreen. In other modalities, the user may interact with the widget 190 using a computer mouse or other input device.

At block 240, a user interaction with the widget 190 generated in block 235 is detected. At block 245, positions of the selected objects 195 are updated (e.g., changed as applicable) in response to the user interaction detected in block 240, and the layout view 185 displaying the objects 195 and the widget 190 is updated to display the objects 195 in their new positions instead of the old positions. The display of the widget 190 may also be updated corresponding to the new positions of the selected objects 195, for instance, such that the widget 190 continues to be based on a bounding box 302 of the objects 195 as updated given the new positions of the objects 195.

In certain embodiments, as part of the processing performed in block 245, the interaction detected in block 240 is interpreted and mapped to a particular positioning action. The positioning action is then applied to the selected objects to determine new positions (i.e., updated positions) for the selected objects. For instance, in some embodiments, the widget-manipulation handler 150 maps the interaction to a positioning action and applies the positioning action to each selected object 195 to update the positions of the selected objects 195. The selected objects are then re-rendered or redrawn in their new positions. The positioning action may cause zero or more of the selected objects to have new positions that are different from their respective previous positions prior to the interaction detected at block 240.

The processing depicted at block 240 and block 245 may repeat each time the user interacts with the widget 190. Examples of the various interactions that may occur and of various positioning actions that may be performed are described below in more detail.

For instance, upon detecting the selection of the axis handle, an embodiment of the widget-manipulation handler 150 interprets this selection as a request to evenly distribute the objects in the dimension corresponding to the axis handle. More specifically, the widget-manipulation handler 150 maps the interaction of a selection of an axis handle to the poisoning action of evenly distributing the objects 195 (i.e., the selected objects to which the applies) in the corresponding dimension. Thus, the widget-manipulation handler 150 calculates a respective updated position for each object 195 and modifies the objects 195 by moving each object 195 to its respective updated position. The application 175 may update the definition of each such object 195 in the object-information repository 110 (e.g., in a file) to indicate the updated position of each object 195. In some embodiments, various other requests can be provided through interaction with the widget 190, as described in more detail below.

In some embodiments, the widget 190 is stationary in the virtual space as the virtual camera moves. For instance, if the perspective changes while the objects 195 remain stationary, the widget 190 maintains position in the virtual space and thus with respect to the objects 195 for which the widget 190 was generated. Specifically, the axis handles and alignment handles maintain their positions in the virtual space and thus relative to the objects 195. As described above, the placements of the axis handles of the widget 190 are based on positions of corners of the bounding box 302 relative to the virtual camera in some embodiments. Thus, if the virtual camera position changes, the placement of the widget 190 if newly generated would be different than prior to the change. However, in some embodiments, the widget 190 does not move in the virtual space (i.e., the axis handles and alignment handles maintain their locations relative to the objects 195 and to one another) as the virtual camera position changes. Allowing the widget 190 to change dynamically can cause potential confusion for a user because the widget 190 is displayed as an object in the virtual space. Thus, the user might expect the widget 190 to remain in its position unless the user indicates a desire to move the widget 190 as is the case with other objects 195 in the virtual space; for instance, an object 195 retains its position in the virtual space as the virtual camera position changes, and thus, in some embodiments, the widget 190 remains stationary as well, relative to that object 195.

Figure 4:
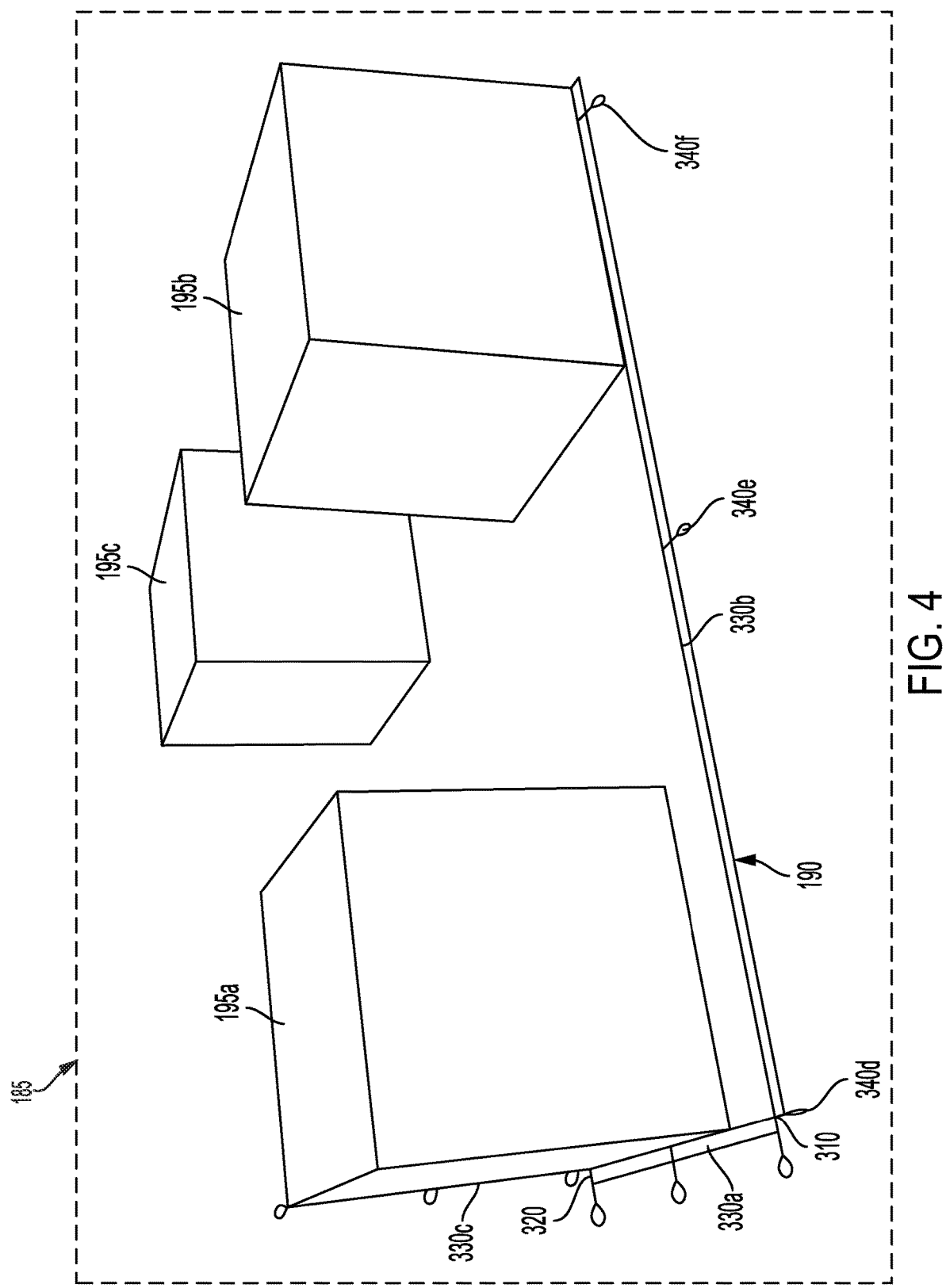
FIG. 4 depicts the widget of FIG. 3 after a change in perspective, according to certain embodiments.

FIG. 4 depicts the widget of FIG. 3 after a change in perspective (e.g., a change in the virtual camera position), according to certain embodiments. In some embodiments, if the application 175 receives (e.g., from a user) a request to change the perspective, the application 175 changes the layout view 185 of the objects 195 and, specifically, the perspective on the objects 195, based on moving the virtual camera position; however, the application 175 and the positioning system 100 maintain the position of the widget 190 with respect to the objects 195. However, in some embodiments, if the positioning system 100 receives a request to regenerate the widget 190, then the widget generator 140 removes the widget 190 from the layout view 185, calculates the placement of an updated widget 190 (e.g., the positions of the axis handles and the alignment handles), and generates the updated widget 190. The widget generator 140 renders the new widget 190 in the layout view 185 by providing an indication of the layout view's appearance to the renderer 120, i.e., by requesting that the renderer 120 to render the layout view 185 as updated.

Aligning Objects Based on a Detected Interaction with the Widget

Figure 5:
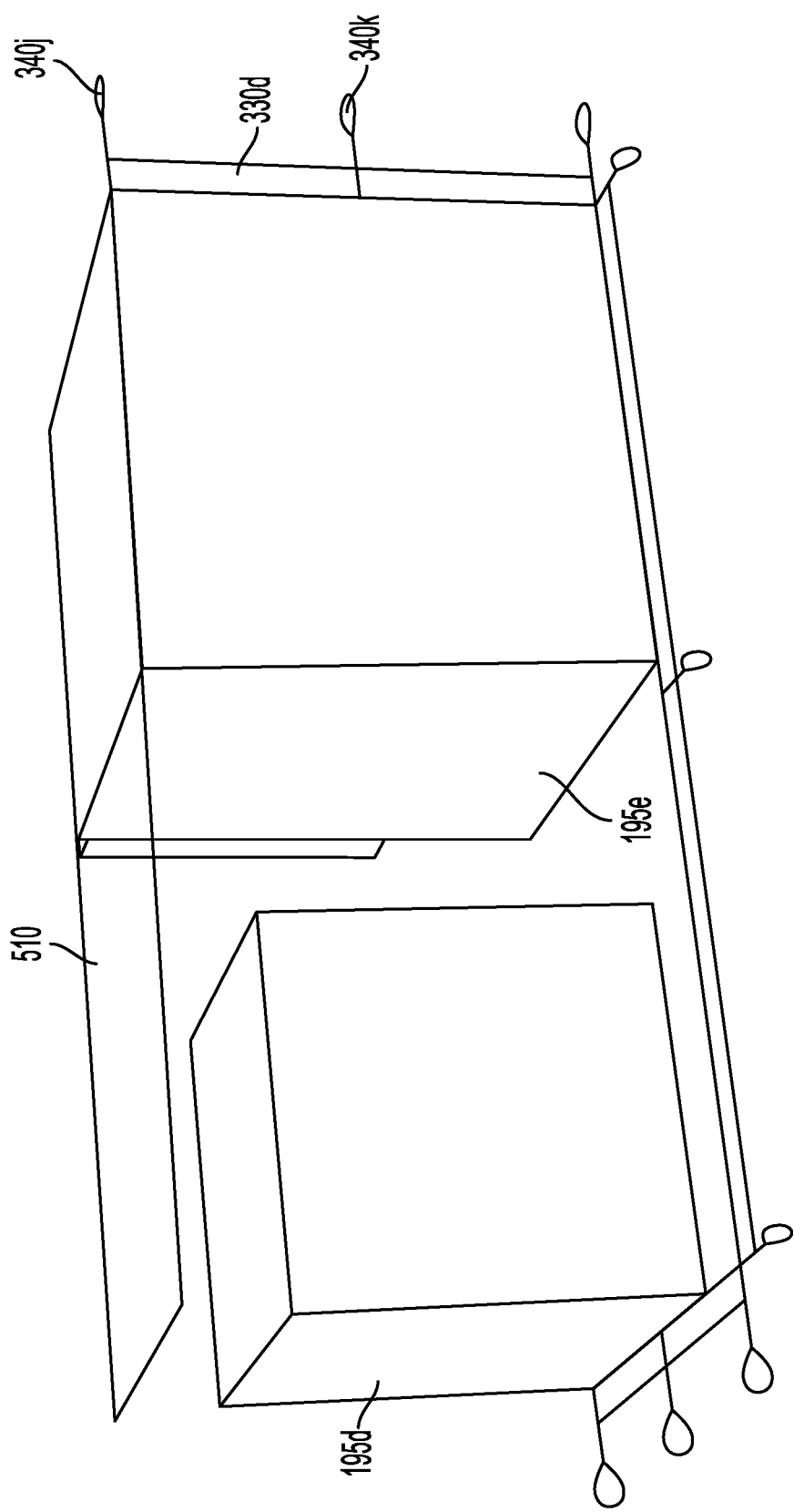
FIG. 5 depicts use of a handle of a widget to align an object through the positioning system, according to certain embodiments.

FIG. 5 depicts use of an alignment handle 340j of a widget 190 to align objects 195 in the positioning system 100, according to certain embodiments. As shown in FIG. 5, prior to a request to align a first object 195d and a second object 195e to a particular alignment handle 340j, the first object 195d and the second object 195e are not both aligned to the alignment handle 340j in the dimension corresponding to the alignment handle 340j; rather, only the second object 195e is aligned to the alignment handle 340j (i.e., has an edge at the alignment handle 340j).

In some embodiments, the widget-manipulation handler 150 detects an interaction with the alignment handle 340j by a user and, specifically, detects the selection of the alignment handle 340j. Responsive to that interaction, the widget-manipulation handler 150 maps the interaction to a positioning action, specifically, alignment of objects 195 where the alignment is based on the alignment handle 340j. The widget-manipulation handler 150 thus modifies one or more objects 195 by aligning respective edges of such objects 195 with an alignment plane corresponding to the alignment handle 340j.

As discussed above, in some embodiments, a shape (e.g., a teardrop shape) of the alignment handle 340j has a surface perpendicular to the corresponding axis handle 330d. Thus, the alignment plane in which that surface lies is perpendicular to the axis handle 330*d* as well. In some embodiments, this alignment plane is the plane with which objects 195 are aligned upon use of the alignment handle 340*j*.

As shown in FIG. 5, upon selection of an alignment handle 340*j*, the widget-manipulation handler 150 generates an alignment section 510, which is a portion of the alignment plane in which the surface of the alignment handle 340*j* lies. Specifically, the widget-manipulation handler 150 generates (e.g., for display by the renderer 120) the alignment section 510 responsive to a tentative selection from the user, such as when the user hovers a mouse cursor over the alignment handle 340*j* or when the user touches and holds the alignment handle on a touchscreen. An example of the alignment section 510 is a cross-section of the alignment plane with the bounding box 302. In the example of FIG. 5, the alignment handle 340*j* selected is located at the top of the bounding box 302; thus, the alignment plane in this case is the plane in which the top of the bounding box 302 lies, and thus, the alignment section 510 is the top of the bounding box 302.

When the user selects an alignment handle 340*j*, the widget-manipulation handler 150 aligns one or more objects 195 to the alignment section 510, and thus to the alignment plane, corresponding to the alignment handle 340*j* by moving each such object 195 as needed in the dimension corresponding to the alignment handle 340*j*. For instance, each object 195 to be aligned includes a closest edge, which is a point or multiple points closest to the alignment section 510 as compared to other points on the surface of the object 195. To align an object 195 to the alignment section 510, the widget-manipulation handler 150 modifies the object 195 by moving the object such that the closest edge comes in contact with the alignment section 510, potentially without crossing over the alignment section 510, and thus shares the alignment plane. After the modification of each object 195 as needed to align such objects 195 to the alignment section 510, the respective closest edge of each such object 195 to the alignment handle 340*j* has a common value (e.g., the value of the position alignment handle 340*j*) in the dimension corresponding to the alignment handle 340*j*.

In some embodiments, a central alignment handle, such as the central alignment handle 340*k* in FIG. 5, is an alignment handle positioned at or near the center of an axis handle 330*d* or otherwise between two other alignment handles on the same axis handle 330*d*. In some embodiments, a central alignment handle 340*k* enables centering of objects 195 along an alignment plane corresponding to the central alignment handle 340*k*, and thus, if the central alignment handle 340*k* is positioned at the center of the bounding box 302 in the corresponding dimension, the central alignment handle 340*k* enables centering objects 195 within the bounding box 302 in that dimension as well. For instance, although not shown in FIG. 5, the alignment plane in which the central alignment handle 340*k* lies intersects the middle of the bounding box 302, and thus, the corresponding alignment section 510 is a cross-section of the bounding box 302 that cuts through the center of the bounding box 302. Upon detecting a selection of this central alignment handle 340*k*, an embodiment of the widget-manipulation handler 150 modifies each object 195 as needed to align a centroid of each such object 195 with the alignment plane of that alignment handle 340*k*. Thus, after such selection of a central alignment handle 340*k*, each object 195 is centered on the alignment section 510 corresponding to that central alignment handle 340*k*.

In some embodiments, to execute an alignment, the widget-manipulation handler 150 modifies an object 195 by moving that object in one dimension only, specifically, in the dimension corresponding to the alignment handle 340*j* that was selected and corresponding to the axis handle 330*d* of that alignment handle 340*j*. For instance, if the axis handle 330*d* corresponding to the alignment handle 340*j* shown in FIG. 5 corresponds to the Z axis, which corresponds to the vertical dimension, the widget-manipulation handler 150 moves each object 195 vertically to align that object 195 with the alignment section 510 shown. In certain embodiments, selection of an alignment handle 340*j* causes movement in only a single dimension. However, to prompt movement of objects 195 in multiple dimensions, a user can select multiple alignment handles at the same time (e.g., via multiple simultaneous touches on a touchscreen) or in sequence. For instance, to center each object 195 in all dimensions of the bounding box 302, a user can select each central alignment handle, one at a time, thus causing the widget-manipulation handler 150 to center each object 195 in each dimension, one at a time, until the objects 195 are fully centered in the bounding box 302.

Figure 6:
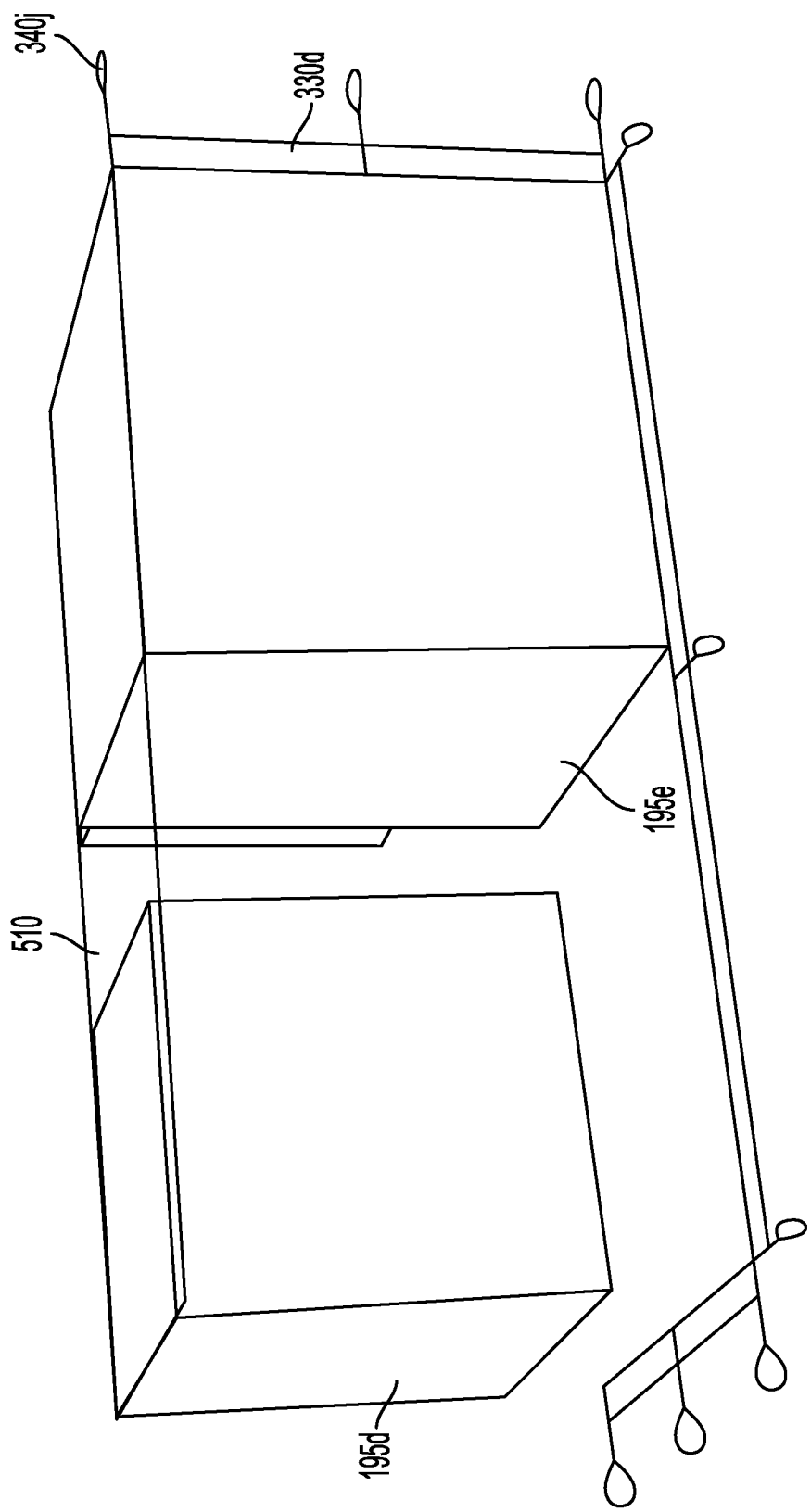
FIG. 6 depicts the alignment of objects after the use of the handle of FIG. 5, according to certain embodiments.

FIG. 6 depicts alignment of the objects 195 shown in FIG. 5, after selection of the alignment handle 340*j*, according to certain embodiments. As shown in FIG. 6, in this example, the first object 195*d*, which was not in contact with the alignment section 510 in FIG. 5, is now in contact with the alignment section 510. Specifically, a closest edge of the first object 195*d* is now aligned with and in contact with the alignment section 510 and, thus, with both the alignment plane and the edge of the bounding box 302. Further, the top of the first object 195*d* now shares the alignment plane with the top of the second object 195*e*. Due to the executed alignment, each object 195 to which the widget 190 applies is now aligned with the alignment handle 340*j* selected and with its corresponding alignment section 510.

The alignment of objects can be useful in various scenarios. For instance, returning to the example in which the positioning system 100 is being used to manipulate objects 195 in the interior of a vehicle, suppose multiple air conditioning vents have been provided as objects in the layout view 185. A user would like those air conditioning vents to be aligned at a common vertical coordinate. Thus, the user selects each air conditioning vent and provides a request to generate a widget 190. In response, the widget-manipulation handler 150 generates a widget 190 based on a bounding box 302 around the air conditioning vents. The user then tentatively selects an alignment handle 340*j* at the top of the vertical axis. The user knows which alignment handle 340*j* to tentatively select due to the placement of the alignment handle at the top of the bounding box and due to the horizontal orientation of the alignment handle, which indicates how the air conditioning vents would be aligned with a common vertical coordinate. When the user selects the alignment handle, the widget-manipulation handler 150 moves each air conditioning vent upward as needed to align that air conditioning vent with the top of the bounding box 302. Thus, all of the air conditioning vents become aligned at their tops as the user intended.

As discussed above, in some embodiments, an alignment handle 340*j* includes a surface perpendicular to its corresponding axis handle 330*d*. Further, various alignment handles corresponding to a single axis handle 330*d* are spread out along the axis handle 330*d*. As a result, each alignment handle of the widget 190 has a unique combination of orientation and position, and thus, each alignment handle is associated with a unique alignment plane and a unique alignment section 510. The position and orientation (e.g., the orientation of the teardrop shape) of the alignment handle informs the user as to the position and orientation of the alignment plane and, thus, the alignment section 510. Given the various alignment handles of the widget, the widget 190 is enabled to provide the user a mechanism to align objects 195 to various possible alignment sections 510, each such alignment section 510 corresponding to an alignment handle. Further, the shape and orientation of each alignment handle helps the user to visualize how objects 195 will be aligned if the user selects an alignment handle.

Although FIG. 5 and FIG. 6 illustrate objects 195 that are polyhedrons, it will be understood that embodiments described herein are not limited to objects 195 that are polyhedrons. For instance, various objects 195 have edges (e.g., one or more points closest to a plane) and centroids (e.g., a point determined to be the center of mass assuming uniform density). One of skill in the art will understand how to calculate an edge or a centroid of an object 195 for objects 195 of various shapes not limited to polyhedrons. However, for the sake of simplicity in illustration, the objects 195 shown herein are polyhedrons.

Distributing Objects Based on a Detected Interaction with a Widget

Figure 7:
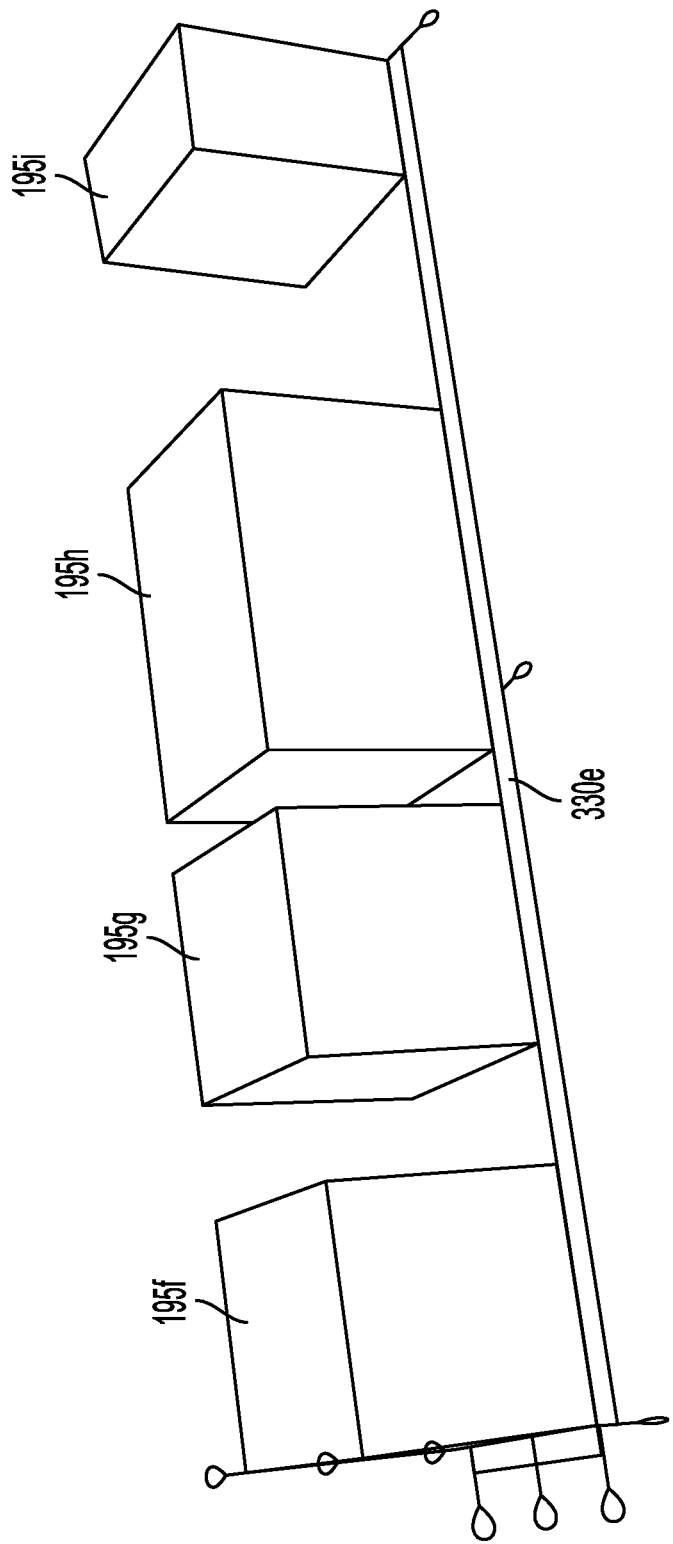
FIG. 7 depicts a set of objects prior to being automatically distributed, according to certain embodiments.

Additionally or alternatively to the above, the widget 190 enables objects 195 to be automatically modified to be evenly distributed in a dimension. For instance, FIG. 7 depicts a set of objects 195, including a first object 195*f*, a second object 195*g*, a third object 195*h*, and a fourth object 195*i*, prior to being automatically distributed, according to certain embodiments. As shown in FIG. 7, the objects 195 illustrated are not evenly distributed along the dimension, which is the Y axis in this example, corresponding to a first axis handle 330*e*. Specifically, a first space between a first object 195*f* and a second object 195*g*, a second space between the second object 195*g* and a third object 195*h*, and a third space between the third object 195*h* and a fourth object 195*i* are not all equal. In certain embodiments, for even distribution in the dimension, the first space, the second space, and the third space would be equal.

In some embodiments, the widget-manipulation handler 150 detects an interaction by a user with an axis handle, for instance, in the case of selection of the axis handle 330*e* shown in FIG. 7. Responsive to selection of an axis handle 330*e*, the widget-manipulation handler 150 maps the interaction to the positioning action of even distribution; thus, the widget-manipulation handler 150 evenly distributes objects 195 (e.g., the objects 195 to which the widget 190 applies) in the dimension corresponding to the axis handle 330. Thus, in this case, upon detecting selection of the axis handle 330*e*, the widget-manipulation handler 150 distributes the objects 195 along the corresponding dimension (e.g., the Y dimension) by modifying the objects 195 to cause the first space, the second space, and the third space to be equal.

Figure 8:
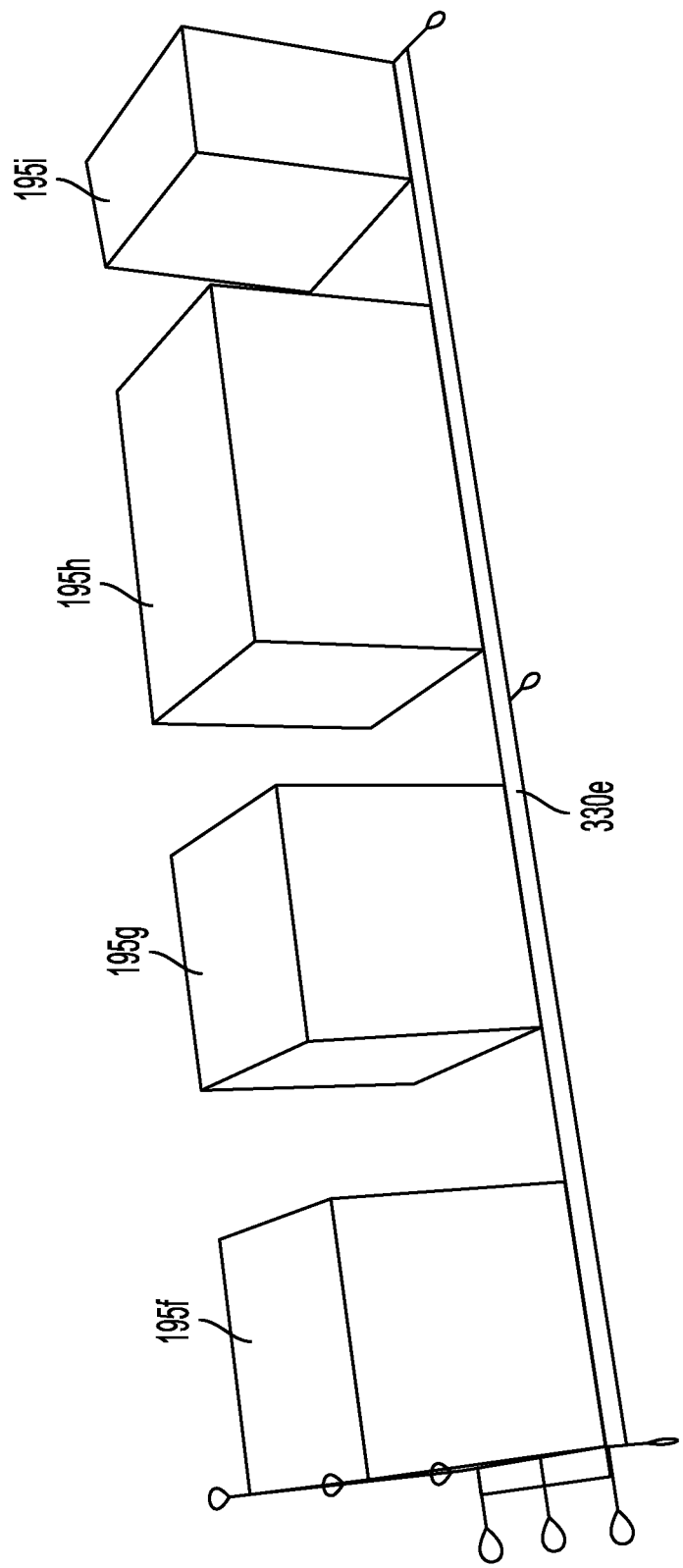
FIG. 8 depicts the set of objects of FIG. 7 after being automatically distributed, according to certain embodiments.

FIG. 8 depicts the set of objects 195 of FIG. 7 after being automatically distributed, according to certain embodiments. Specifically, as shown in FIG. 8, after distribution of the objects 195 responsive to selection of the first axis handle 330*e*, the spaces between each pair of adjacent objects 195 are equal to one another.

An embodiment of the widget-manipulation handler 150 determines how to position the objects 195 using one or more of various techniques. For instance, the widget-manipulation handler 150 sorts the objects in ascending order of the respective coordinates of their minimum edges in the dimension in which the objects 195 are being distributed (i.e., the respective edges having the lowest coordinate in that dimension) or, additionally or alternatively, in ascending order of the respective coordinates of their centroids in that dimension. The widget-manipulation handler 150 can thus ensure that the objects 195 maintain the resulting sort order after the distribution. The widget-manipulation handler 150 positions the first object 195 in the sort order (e.g., the object 195 having the lowest minimum edge or the lowest centroid), such that the respective minimum edge meets the minimum edge (i.e., the lowest point in that dimension) of the bounding box 302 and positions the last object in the sort order (e.g., the object 195 having the highest minimum edge or the highest centroid), such that a respective maximum edge of the last object 195 meets the maximum edge of the bounding box 302. The widget-manipulation handler 150 determines the total space between objects 195 in the dimension and divides that total space by the number of spaces between objects 195 (i.e., the number of objects minus one) to determine a desired spacing. Taking the remaining objects 195 in ascending order of minimum edges, each remaining object 195 is positioned such that its minimum edge is a distance equal to the desired spacing from the maximum edge of the prior object 195 in the sort order. It will be understood that various other techniques are possible to evenly distribute the objects 195.

Various situations could exist in which the above technique of distributing objects 195 evenly s useful. For instance, returning to the example of arranging air conditioning vents in a vehicle interior, suppose that the user notices that the air conditioning vents on the front dash of the vehicle are not evenly spaced horizontally and desires even spacing between the air conditioning vents. In that case, with the widget 190 already generated, the user selects an axis handle that extends horizontally and corresponds to a horizontal dimension. The widget-manipulation handler 150 detects this interaction and moves the air conditioning vents as needed to provide even spacing between each adjacent pair of air conditioning vents.

Figure 9:
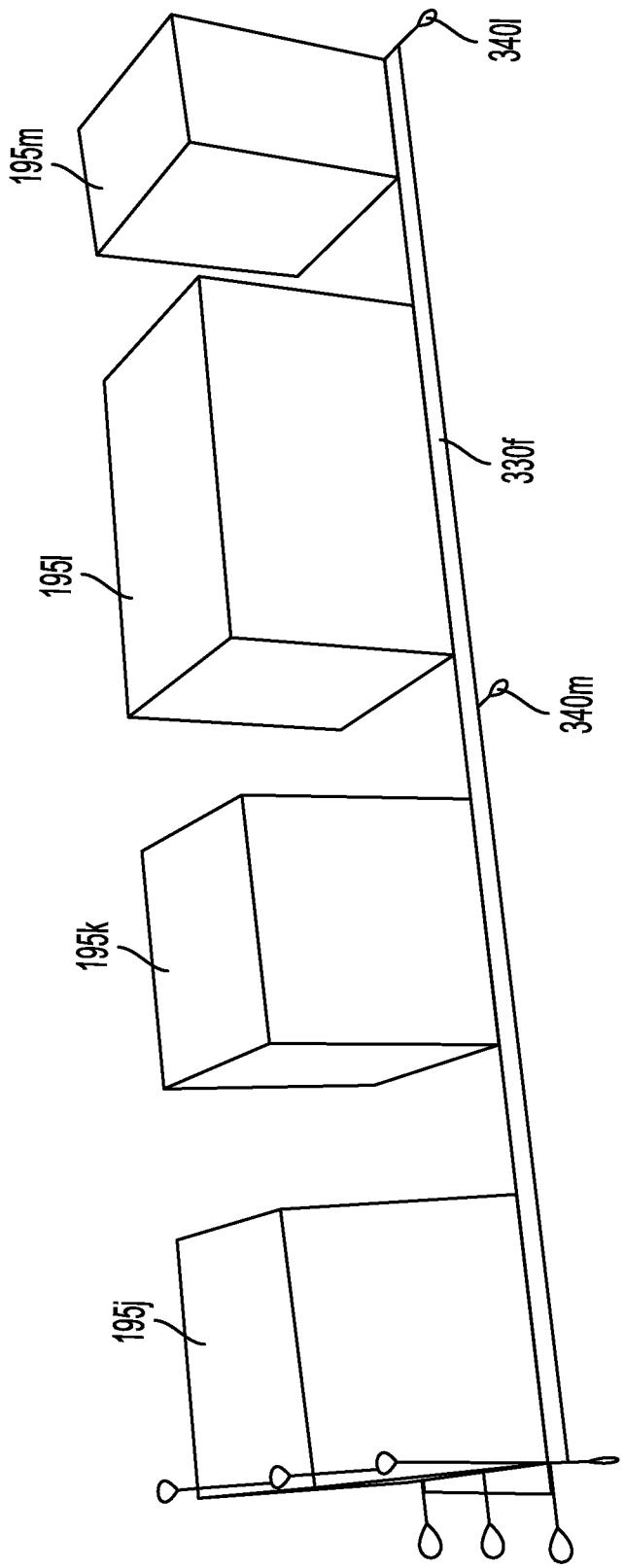
FIG. 9 depicts a set of objects distributed in one dimension prior to changing the length of a bounding box in that dimension, according to certain embodiments.

FIG. 9 depicts a set of objects 195, including a first object 195*j*, a second object 195*k*, a third object 195*l*, and a fourth object 195*m*, distributed in a first manner in one dimension prior to changing the length of the bounding box 302 in that dimension, according to certain embodiments. In this example, the spacing between objects 195 as shown in FIG. 9 may or may not be even, for instance, the spacing between the first object 195*j* and the second object 195*k* and between the third object 195 and the fourth object 195*m* could be equal but need not be.

In some cases, the length of the bounding box 302, i.e., the space over which the objects 195 are distributed in the first dimension, could change. For instance, the user may decide that the objects 195 should take up more space or should extend for a farther length. In some embodiments, the widget 190 enables extending the length of the bounding box 302 by extending the length of the widget 190.

For instance, as shown in FIG. 9, the user can drag an alignment handle 340*l* to reposition the alignment handle 340*l* and thus to change the size of the widget 190. In some embodiments, the widget-manipulation handler 150 maintains the correspondence between the widget 190 and the bounding box 302, and thus, the widget-manipulation handler 150 changes the size of the bounding box 302 along with the size of the widget 190. For instance, if an edge alignment handle 340*l* (i.e., an alignment handle positioned at the end of the bounding box 302) is dragged inward toward the other alignment handles of the same axis handle 330*f*, then the widget-manipulation handler 150 shortens the widget 190, and thus the bounding box 302, to position the edge of the widget 190 and the edge of the bounding box 302 at the updated position of the alignment handle 340*l*. Analogously, if the alignment handle 340*l* is dragged outward away from the other alignment handles, then the widget-manipulation handler 150 lengthens the widget 190 and the bounding box 302 in the corresponding dimension. In some embodiments, in the case of manipulation of the alignment handle 340*m* located at or near the center of the axis handle 330*f*, in which case inward and outward motion can be ambiguous, the positive and negative directions of the corresponding axis are used to determine whether the widget 190, and thus the bounding box 302, should increase or decrease in size respectively. In other words, for instance, movement of the central alignment handle 340*m* in a positive direction increases the length of the widget 190 while movement of the central alignment handle 340*m* in a negative direction decreases the length of the widget 190.

In some embodiments, when the widget-manipulation handler 150 changes the size of the widget 190, and thus changes the size of the bounding box 302, the widget-manipulation handler 150 dynamically adjusts the characteristics of various handles of the widget 190. Specifically, each axis handle may remain the length of the corresponding edge of the bounding box 302, and each alignment handle may remain at the respective end of each axis handle or, for central axis handles, at the center of the corresponding axis handle. Thus, due to the change in the size of the bounding box 302, the widget-manipulation handler 150 changes the length of the axis handle 330*f* in the dimension corresponding to the change as well as the positions of the alignment handles on that axis handle 330*f*.

In some embodiments, the objects 195 remain inside the bounding box 302 that defines the widget 190. Thus, the objects 195 are modified as needed to be repositioned inside the bounding box 302 as updated. If the widget 190 is shortened, then the widget-manipulation handler 150 moves the objects 195 closer together to accommodate the decrease in space, and if the widget 190 is lengthened, the widget-manipulation handler 150 moves the objects 195 farther apart to utilize the increased space.

Figure 10:
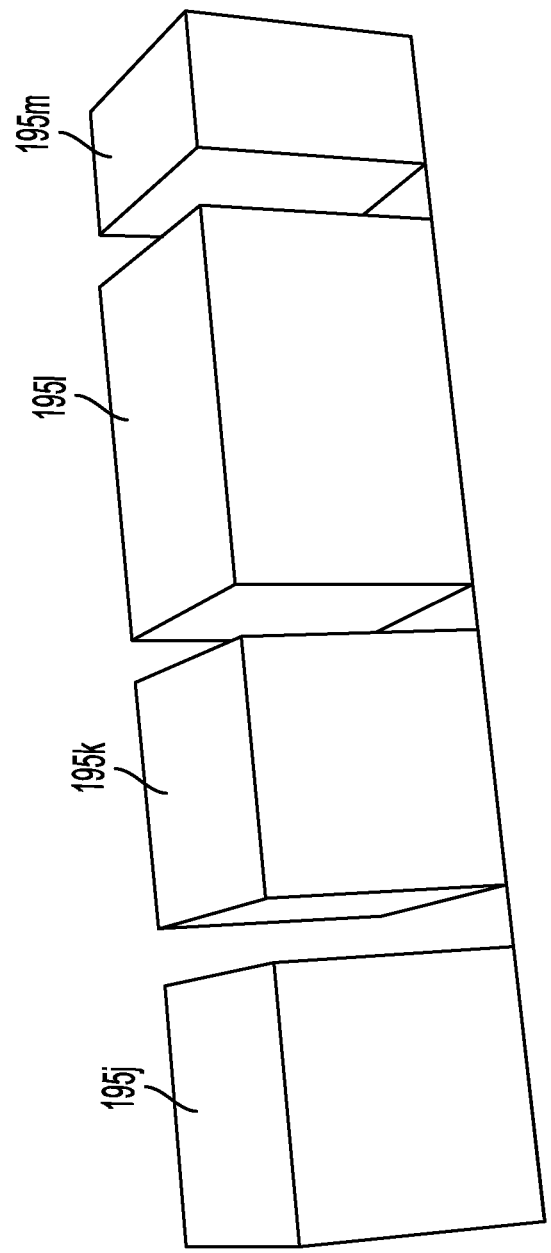
FIG. 10 depicts the set of objects of FIG. 9 distributed in the dimension after a change to the length of the bounding box, according to certain embodiments.

FIG. 10 depicts the set of objects 195 of FIG. 9 distributed in the dimension after a change to the length of the bounding box 302, according to certain embodiments. In the example of FIG. 10, the widget 190 itself is not shown, but FIG. 10 illustrates that change in positions of objects 195 due to shortening of the widget 190. For instance, responsive to detecting that the alignment handle 340*l* has been dragged inward, the widget-manipulation handler 150 has shortened the bounding box 302 in the corresponding dimension and has repositioned the objects 195 to fit within the shortened bounding box 302 without changing the sizes or shapes of the objects 195.

Various techniques are useable to determine how to reposition such objects 195, and examples of such techniques are described below. For instance, FIG. 11 depicts an example of a process 1100 for automatically distributing objects 195, such as responsive to a change in the size of the bounding box 302, according to certain embodiments.

Figure 11:
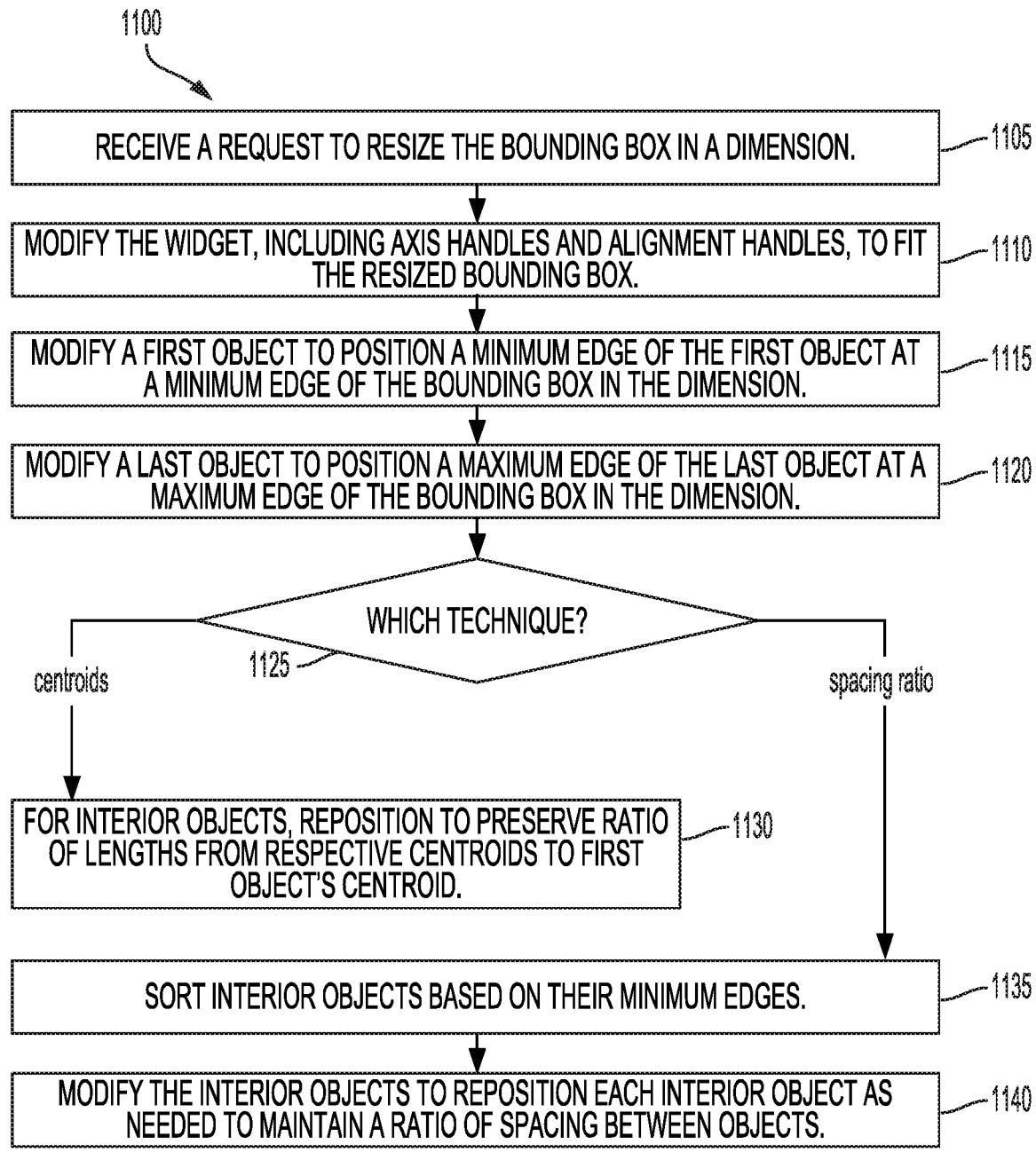
FIG. 11 depicts an example of a process for automatically distributing objects, according to certain embodiments.

As shown in FIG. 11, at block 1105, the process 1100 involves receiving a request to resize the bounding box 302, in particular, to change a length of the bounding box 302 in a dimension (e.g., in a single dimension). For instance, the widget-manipulation handler 150 has detected that a user moved an edge alignment handle toward another alignment handle of the same axis handle, thus indicating shortening of the widget 190 in the dimension. In this example, the widget-manipulation handler 150 maps this interaction to the positioning action of shortening the bounding box 302 in that same dimension corresponding to the alignment handle that was moved and, further, of repositioning the objects 195 based on an updated size of the bounding box 302. In other words, the widget-manipulation handler 150 interprets the interaction as request to shorten the bounding box 302. In certain embodiments in which the widget 190 size is based on the size of the bounding box 302, this interaction can be further interpreted as a request to resize the widget 190 or a request to resize the bounding box 302, which are equivalent. Further, because the bounding box 302 fully contains a set of objects 195 in some embodiments, this interaction with the widget 190 is further interpreted as a request to reposition each such object 195 to ensure the objects 195 remain fully inside the bounding box 302 and take up appropriate space in the bounding box 302. For instance, if the bounding box 302 was a minimum bounding box 302 prior to the interaction, then the widget-manipulation handler 150 modifies the objects 195 such that the updated bounding box 302 remains a minimum bounding box 302, or if the bounding box 302 has a certain percentage of volume (e.g., 110%) of the minimum bounding box 302, then the widget-manipulation handler 150 modifies the objects 195 such that the updated bounding box 302 maintains that certain percentage of the volume of the minimum bounding box 302 as updated.

At block 1110, responsive to the request, the widget-manipulation handler 150 modifies the widget 190. For instance, the widget-manipulation handler 150 shortens the axis handle to cause the corresponding axis handle to end at the updated position of the alignment handle and thus at the edge of the bounding box 302. Further, the widget-manipulation handler 150 repositions the central alignment handle of the axis handle to an updated center of the axis handle, given that the center of the axis handle is dynamic based on the length of the axis handle. In some embodiments, changing the length of the widget 190 (e.g., shortening or lengthening the widget 190) in this dimension does not impact the length of the widget 190 in other dimensions, and thus, the other axis handles and corresponding alignment handles need not be modified in this case.

At block 1115, the process 1100 involves modifying a first object 195, specifically, the object 195 having a minimum edge at the lowest coordinate, as compared to the other objects 195 being distributed, in the relevant dimension (i.e., the dimension in which the size bounding box 302 is changing) to position that minimum edge at the minimum edge of the bounding box 302 in that dimension. In some embodiments, to this end, the widget-manipulation handler 150 moves the first object 195 without changing the shape or size of the first object 195.

At block 1120, the process 1100 involves modifying a last object 195, specifically, the object 195 having a maximum edge at the highest coordinate, as compared to the other objects 195 being distributed, in the relevant dimension to position that maximum edge at the maximum edge of the bounding box 302 in the relevant dimension. In some embodiments, to this end, the widget-manipulation handler 150 moves the last object 195 without changing the shape or size of the last object 195.

At decision block 1125, the process 1100 involves determining a technique for spacing the interior objects 195 (i.e., the objects 195 other than the first object 195 and the last object 195) throughout the length of the bounding box 302 in the relevant dimension. If only one such technique is available, then the widget-manipulation handler 150 identifies that technique and utilizes that technique for distributing (i.e., repositioning) the objects 195 throughout the bounding box 302. In some embodiments, however, the widget-manipulation handler 150 is configured to determine (e.g., select) one of a set of available techniques for redistributing the objects 195.

Certain embodiments provide two such techniques for distributing the bounding box 302. In a first technique, the position of each interior object 195 after the distribution is based on an original distance between the first object's centroid and the interior object's centroid, such that the ratio of such distances for the various interior objects 195 remains constant. In a second technique, however, the ratio of the spacing between objects 195 is retained.

In the example of FIG. 11, the widget-manipulation handler 150 selects between these two techniques, or modes. In one example, a user-definable setting of the positioning system 100 may determine which technique to use, and in that case, the widget-manipulation handler 150 checks the user-definable setting and utilizes the technique indicated. In another example, when the user provides the request to resize the bounding box 302, that request implicitly or explicitly indicates which technique to use. For instance, dragging an alignment handle while pressing the CTRL button on a keyboard could indicate a request to use the first technique, while dragging the alignment handle without pressing CTRL could indicate a request to use the second technique. It will be understood that various mechanisms for determining which technique is used are within the scope of this disclosure.

If the widget-manipulation handler 150 decides to use the first technique (i.e., based on centroids), then the process 1100 proceeds to block 1130. However, if the widget-manipulation handler 150 decides to use the second technique (i.e., based on the spacing ratio), then the process 1100 proceeds to block 1135.

At block 1130, the process 1100 involves modifying the interior objects 195 by repositioning such interior objects 195 as needed in the relevant dimension. As mentioned above, using the first technique, the process 1100 repositions interior objects 195 based on their centroids, and more specifically, the widget-manipulation handler 150 repositions the interior objects 195 such that each interior object's position after the distribution is based on an initial distance (i.e., before resizing the bounding box 302) between the first object's centroid and the interior object's centroid. In other words, for each interior object 195, there was a respective initial distance between the centroid of the interior object 195 and the centroid of the first object 195; in the distribution across the updated bounding box 302, an embodiment of the widget-manipulation handler 150 preserves the ratio among these various initial distances for the various interior objects 195.

Specifically, an embodiment of the widget-manipulation handler 150 modifies an interior object 195 by updating (i.e., changing) the position of the interior object 195 such that the updated position $C_{i,2}$ of a centroid of an interior object i is as follows:

$$C_{i,2} = C_{0,2} + \left((C_{i,1} - C_{0,1}) \times \frac{X_2 - N_2}{X_1 - N_1}\right)$$

In some embodiments, the widget-manipulation handler 150 calculates the above for each interior object 195 and positions each interior object 195 accordingly, i.e., by modifying the interior object 195 to position the centroid of the interior object to the position calculated without changing the size or shape of the interior object 195. In the above, $C_{i,2}$ is the updated position of the centroid of the interior object 195 while $C_{i,1}$ is the original position of the centroid of the interior object 195; $C_{0,2}$ is the updated position of the centroid of the first object 195, the edge of which is aligned to the updated minimum edge of the updated bounding box 302, while $C_{0,1}$ is the original position of the centroid of the first object 195, the minimum edge of which was aligned with the minimum edge of the initial bounding box 302; $X_2$ and $N_2$ are respectively the maximum and minimum possible positions of the centroid of the interior object 195 such that the interior object 195 is still contained within the bounding box 302 as updated; and $X_1$ and $N_1$ are respectively the maximum and minimum possible positions of the centroid of the interior object 195 such that the interior object 195 is still contained within the initial bounding box 302 prior to the update (i.e., prior to resizing the bounding box 302).

Note that a maximum possible position, $X_1$ or $X_2$, whether the updated maximum possible position or the initial maximum possible position, is not necessarily the maximum edge of the bounding box 302 because position would cause the portion of the interior object 195 with higher coordinates than the centroid to extend outside the bounding box 302. Analogously, a minimum possible position, $N_1$ or $N_2$, is not necessarily the minimum edge of the bounding box 302. For instance, in the case of a polyhedron having a length of L=3 in the relevant dimension, the maximum position of the polyhedron is the maximum edge of the bounding box 302 less half this length, such that the half of the polyhedron having higher coordinates than the centroid remains inside the bounding box 302. Analogously, the minimum position is the minimum edge (e.g., 0 in this example) plus half the length of the polyhedron. Thus, in the case of the bounding box 302 having been modified to shorten the bounding box 302 from 43 units to 23 units in the relevant dimension, the initial maximum position is 41.5 and the initial minimum position is 1.5 for this example polyhedron.

It will be understood that this first technique of repositioning objects 195 does not necessarily retain a ratio of the spacing between the various objects 195. More particularly, for objects of different sizes, the ratio of spacing between objects 195 may change in this redistribution of the objects 195 due to the fact that the distance from a centroid to an edge od an object 195 may vary between objects 195, and this first technique is based on centroids. However, distributing objects 195 in this manner can result in an aesthetic balance in the arrangement of the objects 195 of varying sizes, so some users might prefer this technique of redistributing objects 195.

However, at block 1135, based on a selection of the second technique, the process 1100 involves sorting the objects 195 based on their minimum edges in their initial positions (i.e., prior to resizing the bounding box 302. For instance, in the objects 195 of FIG. 10, in ascending order, the objects would be sorted as follows: the first object 195*j*, the second object 195*k*, the third object 195, the fourth object 195*m*. Because this process 1100 retains the ratio of the spacing between objects 195 when using the second technique, as described below, an object 195 may be positioned relative to an object immediately prior to the object 195 according to a resulting sort order.

At block 1140, the process 1100 involves modifying the interior objects 195 by repositioning such interior objects 195 in the relevant dimension to maintain the spacing ratio. Specifically, an embodiment of the widget-manipulation handler 150 modifies an interior object 195 by updating the position of the interior object 195 such that the updated position $N_{i,2}$ of a minimum edge of an interior object i is as follows:

$$N_{i,2} = X_{i-1,2} + \left( (N_{i,1} - X_{i-1,1}) \times \frac{T_2 - \sum_{j=0}^{n-1} L_j}{T_1 - \sum_{j=0}^{n-1} L_j} \right)$$

In some embodiments, the widget-manipulation handler 150 calculates the above for each interior object 195 and positions each interior object 195 accordingly, i.e., by modifying the interior object 195 to position the minimum edge of the interior object to the position calculated. In the above, $X_{i-1,2}$ is the maximum edge of the object 195 adjacent to the interior object 195 but sorted just prior to the interior object 195, while $X_{i-1,1}$ is the position of that same object prior to the update (i.e., prior to resizing the bounding box 302); $N_{i,2}$ is the minimum edge, after the update, of the interior object 195 whose position is being determined, while $N_{i,1}$ is the position of the minimum edge of the interior object 195 prior to the update; $T_2$ is the total length of the bounding box 302 in the relevant dimension after the update, while $T_1$ is the total length of the bounding box 302 in the relevant dimension prior to the update; and for each object j, both before and after the update, $L_j$ is the length of the object in the relevant dimension. Thus, $T_2 - \sum_{j=0}^{n-1} L_j$ is the total space between objects after the update, and $T_1 - \sum_{j=0}^{n-1} L_j$ is the total space between object prior to the update, assuming that the length of the objects 195 remains unchanged by the change in the size of the bounding box 302.

This technique of repositioning objects 195 positions objects 195 along an updated length of the bounding box 302 in the relevant dimension while retaining the ratio of spacing between objects 195. This manner of distributing objects 195 may be useful, for instance, when the spacing between objects is desired to be consistent.

Returning to the example of designing a vehicle interior, suppose the air conditioning vents being positioned in the vehicle interior have varying sizes, and the user has just been informed that the horizontal space in which the air conditioning vents are spaced is a bit longer than the user first realized. Thus, the user would like to horizontally stretch the bounding box 302 of that contains the air conditioning vents, which are represented as objects 195. In one example, the air conditioning vents in the vehicle interior have been skillfully designed in various sizes and laid out in the manner that is aesthetically pleasing despite the varying sizes. While it is not essential to maintain the ratio of spacing, it is desired to obtain that aesthetic appeal. Thus, the user provides a request to stretch the bounding box 302 in the horizontal dimension and to redistribute the objects 195 based on their centroids. For instance, to provide this request, the user drags an alignment handle outward. Responsive to this interaction with the widget 190, the widget-manipulation handler 150 utilizes the first technique described above to reposition each interior object 195 based on the centroids. In another example, however, the user has been advised that a common part will be manufactured and used to create spacing between the air conditioning vents. Thus, although the sizes of the air conditioning vents vary, it is important that the spacing between each air of adjacent vents remains consistent, as it is prior to the update. In this case, the user provides a request to stretch the bounding box 302 in the horizontal dimension and to redistribute the objects 195 in a manner that maintains the spacing ratio. For instance, to provide this request, the user drags an alignment handle outward while holding down the CTRL key on a keyboard. As such, the widget-manipulation handler 150 utilizes the second technique described above to reposition each interior object 195 based on the spacing ratio.

Complex Distribution of Objects Based on a Detected Interaction with a Widget

Figure 12:
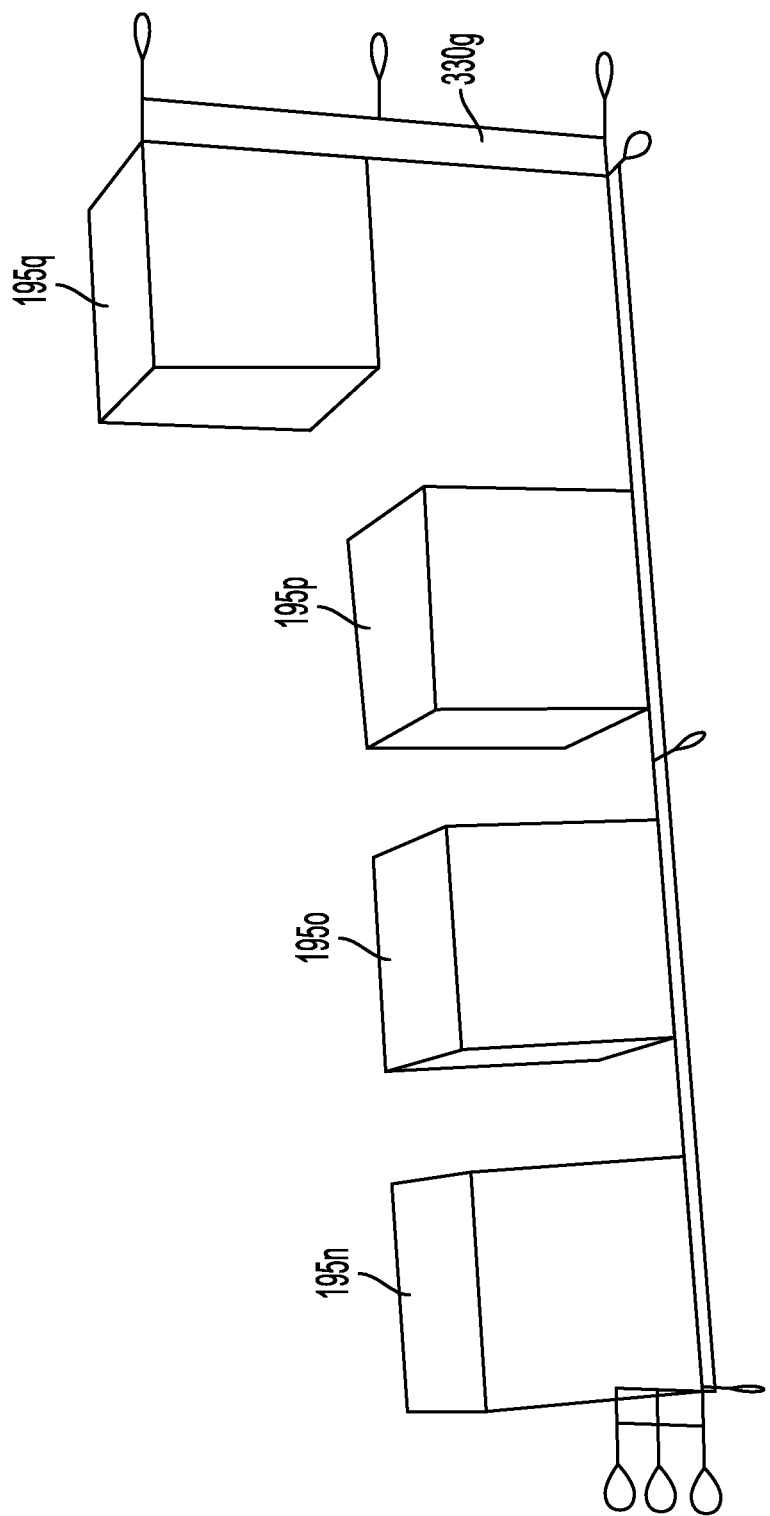
FIG. 12 depicts an example set of objects prior to distribution in a dimension when the placement of such objects within that dimension does not indicate an ordering for the distribution, according to certain embodiments.

FIG. 12 depicts an example set of objects 195 prior to distribution in a dimension when the placement of such objects 195 within that dimension does not indicate an ordering for the distribution, according to certain embodiments. As shown in FIG. 12, this example involves a first object 195*n*, a second object 195*o*, a third object 195*p*, and a fourth object 195*q*. In this example, the first object 195*n*, the second object 195*o*, and the third object 195*p* are aligned in a dimension corresponding to a first axis handle 330*g*. More generally, however, there may be a set of objects 195 to which the widget 190 applies, and two or more of such objects 195 may be aligned in a dimension in that two or more of such objects have respective minimum edges or respective centroids that have the same coordinate in that dimension. In some embodiments, the widget 190 enables redistributing the objects 195 in the dimension in which two or more of such objects 195 are aligned.

In a conventional system, when asked to distribute a set of objects in a dimension in which two or more of such objects are aligned, the conventional system could arbitrarily determine an ordering of the aligned objects in the dimension after distribution. For instance, given the example of FIG. 12, a conventional system would likely determine that the fourth object 195*q* should be the highest (i.e., should have the highest coordinate of its centroid edge in the dimension). However, suppose that the second object 195*o* was created in the conventional system prior to creation of the first object 195*n*, which was created prior to creation of the third object 195*p*. An example conventional system uses this ordering of creation to break the tie between the first object 195*n*, the second object 195*o*, and the third object 195*p*. Thus, in distributing the objects in the first dimension (e.g., vertically in this example), the conventional system leaves the fourth object 195*q* where it is, moves the second object 195*o* up to the second highest position, moves the first object 195*n* up to the third highest position, and leaves the third object 195*p* where it is, aligned with the minimum edge of the bounding box in that dimension. However, this staggering of heights is likely not what the user wanted.

Regarding FIG. 8, this disclosure provides that objects 195 can be evenly distributed by sorting the objects 195 and then positioning each object 195 based on a distance from the prior object 195. However, this technique alone may not be useful if objects are aligned in the dimension in which the objects 195 are to be evenly distributed, as in FIG. 12. For instance, when the first object 195*n*, the second object 195*o*, and the third object 195*p* are sorted based on their minimum edges or centroid positions in the dimension, the resulting sort order could be non-deterministic given that the first object 195, the second object 195, and the third object 195 have minimum edges and centroids at common positions.

In some embodiments, the widget-manipulation handler 150 determines a sort order of the objects 195 based on an alternative dimension (i.e., a dimension other than a first dimension in which the objects 195 are being distributed). In other words, where information is missing in the first dimension to determine a sort order and thus a redistribution order, the widget-manipulation handler 150 infers a sort order based on a sort order in another dimension or in multiple other dimensions.

For instance, an embodiment of the widget-manipulation handler 150 determines an intermediate sort order by sorting the objects 195 based on their minimum edges in a second dimension and then sorting the objects 195 based on their minimum edges in a third dimension, retaining the existing ordering (e.g., from the second dimension) among objects 195 having minimum edges at the some coordinates in the third dimension. The widget-manipulation handler 150 could alternatively determine the intermediate sort order by sorting the objects 195 based on the positions of their centroids in the second dimension and then sorting the objects based on the positions of their centroids in the third dimension, retaining the existing ordering from the second dimension. In another example, the widget-manipulation handler 150 utilizes both minimum edges and centroids to determine the sort order. The determination of dimension is used for sorting first (e.g., the second dimension or the third dimension) may be selected arbitrarily or based on a setting in the position system 100. In some embodiments, however, sorting is performed in only one alternative dimension, and in that case, the alternative dimension could be chosen arbitrarily, or based on a setting, from the dimensions other than the first dimension. By sorting in another dimension first, and thereby basing the sort order on the intermediate sort order, the widget-manipulation handler 150 incorporates information about object ordering in other dimensions.

Figure 13:
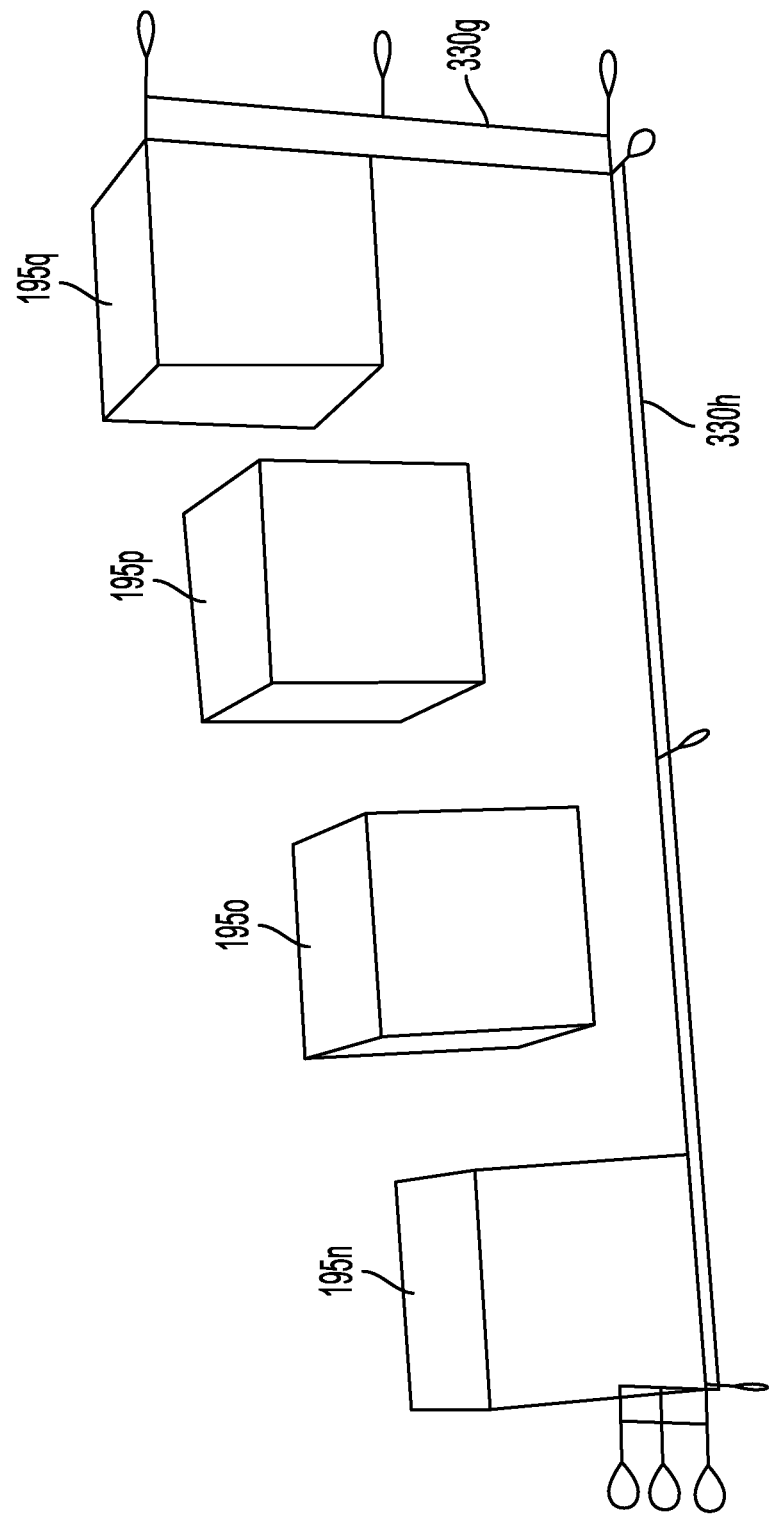
FIG. 13 depicts the example set of objects of FIG. 12 after distribution in the dimension when the placement of such objects in the dimension prior to the distribution did not indicate an ordering for the distribution, according to certain embodiments.

FIG. 13 depicts the example set of objects 195 of FIG. 12 after distribution in the first dimension when the placement of such objects 195 in the first dimension prior to the distribution did not indicate an ordering for the distribution, according to certain embodiments. As shown in FIG. 13, in this example, the widget-manipulation handler 150 determines that the objects 195 should be sorted in the following order: the first object 195n, the second object 195o, the third object 195p, and the fourth object 195q. Although the first object 195n, the second object 195o, and the third object 195p are aligned in the first dimension, which is the dimension of the distribution, the objects 195 are not aligned in the second dimension corresponding to a second axis handle 330h. Thus, the widget-manipulation handler 150 determines the sort order of the first object 195n, the second object 195o, and the third object 195p based on sorting in the second dimension (e.g., from left to right in this example) and uses that sort order to determine how to distribute the objects in the first dimension (e.g., from top to bottom in this example). In this manner, the resulting distribution of the objects 195 is more logical and more likely what the user wanted.

Figure 14:
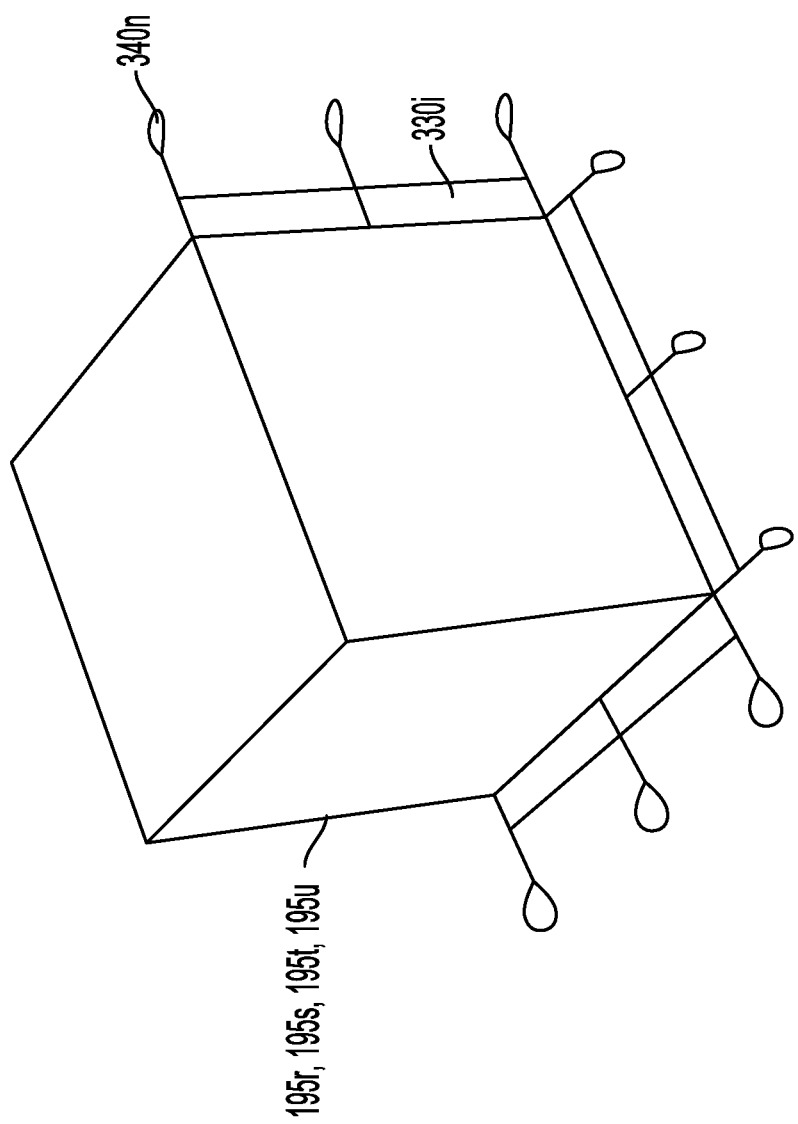
FIG. 14 depicts a second example set of objects prior to distribution in a dimension when the placement of such objects in the dimension does not indicate an ordering for the distribution, according to certain embodiments.

FIG. 14 depicts a second example set of objects 195, including a first object 195r, a second object 195s, a third object 195t, and a fourth object 195u, prior to distribution in a dimension when the placement of such objects 195 in that first dimension does not indicate an ordering for the distribution, according to certain embodiments. Specifically, in this example, the objects 195 are aligned in every dimension. Thus, if a user were to provide a request to enlarge the bounding box 302 in the first dimension in this example, such as by dragging the alignment handle 340n shown upward and thereby extending the length of the axis handle 330i, there is no information in the first dimension as to how to distribute the objects 195 over the resulting updated bounding box 302.

In a conventional system, given an example such as that in FIG. 14, a sort order might not be determinable at all. Rather, with all objects aligned in each dimension, a conventional system receives an indication to enlarge a bounding box, and in response, the conventional system stretches each object to fit an updated bounding box. In other words, the conventional system does not interpret this indication to enlarge the bounding box as a request to distribute objects, because it is not obvious how to distribute objects that are aligned in all dimensions. Rather, the conventional system interprets an enlargement of the bounding box as a request to enlarge the objects within the bounding box. Thus, at the end of such operation, each of the objects has increased in respective size, but the objects are still aligned in all dimensions.

According to some embodiments, however, the widget-manipulation handler 150 interprets an enlargement of the bounding box 302 as a request to distribute the objects 195 in the bounding box 302, potentially while maintaining the size and shape of each object 195. More specifically, the widget-manipulation handler 150 maps the interaction corresponding to enlarging the bounding box 302 (e.g., such as by dragging an alignment handle) to a positioning action of distributing objects throughout the updated bounding box 302. Because the objects 195 are aligned in each dimension, however, there is no information in either a second dimension or a third dimension as to a desired ordering of such objects 195. Sorting the objects 195 in the second dimension or the third dimension prior to sorting in the first dimension will not yield further useful information about how to distribute the objects 195. Thus, some embodiments determine a sort order without such information; for instance, the sort order could be determined arbitrarily, such as based on an order in which the objects 195 were created or moved into the layout view 185.

Figure 15:
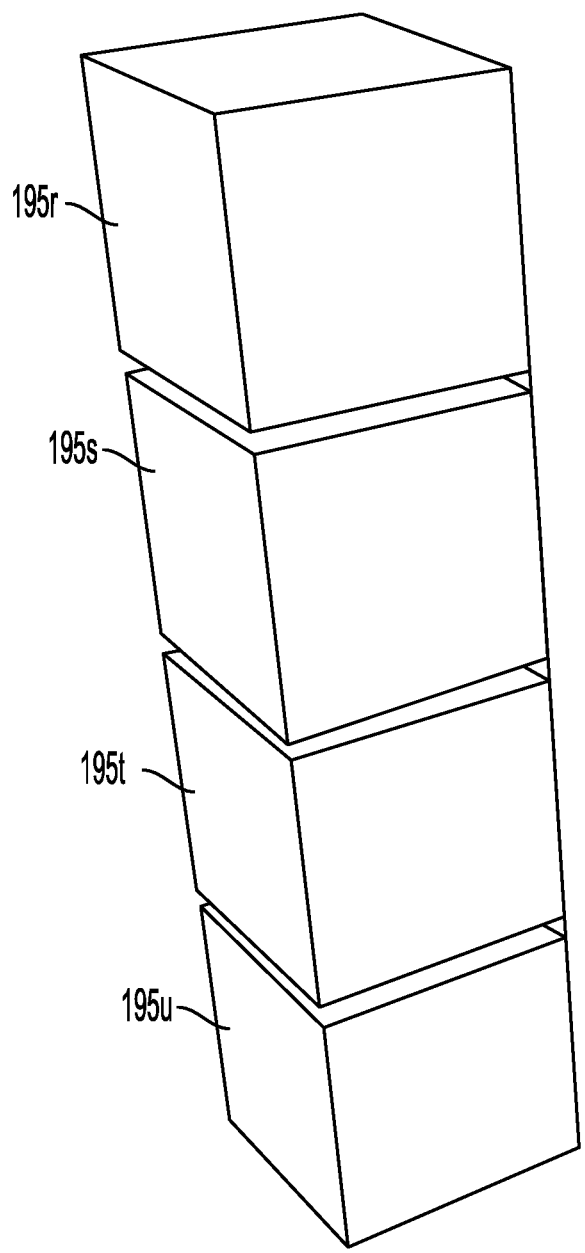
FIG. 15 depicts the second example set of objects of FIG. 15 after distribution in the dimension when the placement of such objects in the dimension prior to the distribution did not indicate an ordering for the distribution, according to certain embodiments.

FIG. 15 depicts the second example set of objects 195 of FIG. 14 after distribution in the first dimension when the placement of such objects 195 in the dimension prior to the distribution did not indicate an ordering for the distribution, according to certain embodiments. In the example of FIG. 15, the widget 190 itself is not shown, but FIG. 15 illustrates that change in positions of objects 195 due to enlarging the widget 190 in the first dimension. As shown in FIG. 15, the widget-manipulation handler 150 has interpreted enlargement of the bounding box 302 in the first dimension as a request to distribute the objects 195 over an updated length of the bounding box 302 in the first dimension. To this end, an embodiment of the widget-manipulation handler 150 determines a sort order for the objects 195, such as by arbitrarily ordering the objects 195. Similar to the techniques described above with respect to evenly distributing objects in a dimension in FIG. 11, the widget-manipulation handler 150 positions a first object in the sort order so as to align a minimum edge of the first object 195 with the minimum edge of the bounding box 302 as updated in the first dimension and, further, positions a last object 195 in the sort order to align a maximum edge of the last object 195 with the maximum edge of the bounding box 302 as updated in the first dimension.

Based on the sort order, the widget-manipulation handler 150 positions the interior objects 195 evenly throughout the space between the first object 195 and the second object 195; for instance, the centroids of the interior objects 195 are spaced evenly between the centroid of the first object 195 and the centroid of the last object 195, or the interior objects 195 are positioned to provide a common spacing between each pair of adjacent objects 195 in the sort order. It will be understood that that, in the resulting distribution, that common spacing could be negative, such as when the objects 195 are distributed but still overlapping.

In some embodiments, however, the widget-manipulation handler 150 is able to stretch the objects 195 responsive to an expansion of the bounding box 302 and is also configured to distribute the objects 195 responsive to expansion of the bounding box 302. In that case, the widget-manipulation handler 150 decides how the resizing of the bounding box 302 is intended by the user to be interpreted. For instance, when in a first mode, the widget-manipulation handler 150 stretches the objects 195, and in a second mode, the widget-manipulation handler 150 distributes the objects 195 while maintaining the shape and size of the objects 195. In this case, various mechanisms could be used to set a current mode of the widget-manipulation handler 150. For instance, the positioning system 100 includes a setting, determinable by the user, which indicates whether the objects 195 should be stretched (i.e., in the first mode) or distributed (i.e., in the second mode) in this case. For another example, the widget-manipulation handler 150 enables the user to provide an indication of which mode to use. For instance, if the user provides the request to resize the bounding box 302 while simultaneously holding down the CTRL key, then the widget-manipulation handler 150 interprets this as a request to be in the first mode and therefore to stretch the objects 195; if the user provides the request to resize the bounding box 302 without simultaneously holding down the CTRL key, then the widget-manipulation handler 150 interprets this as a request to be in the second mode and therefore to distribute the objects 195 as described above. It will be understood that various mechanisms exist for enabling a user to select between such modes.

Figure 16:
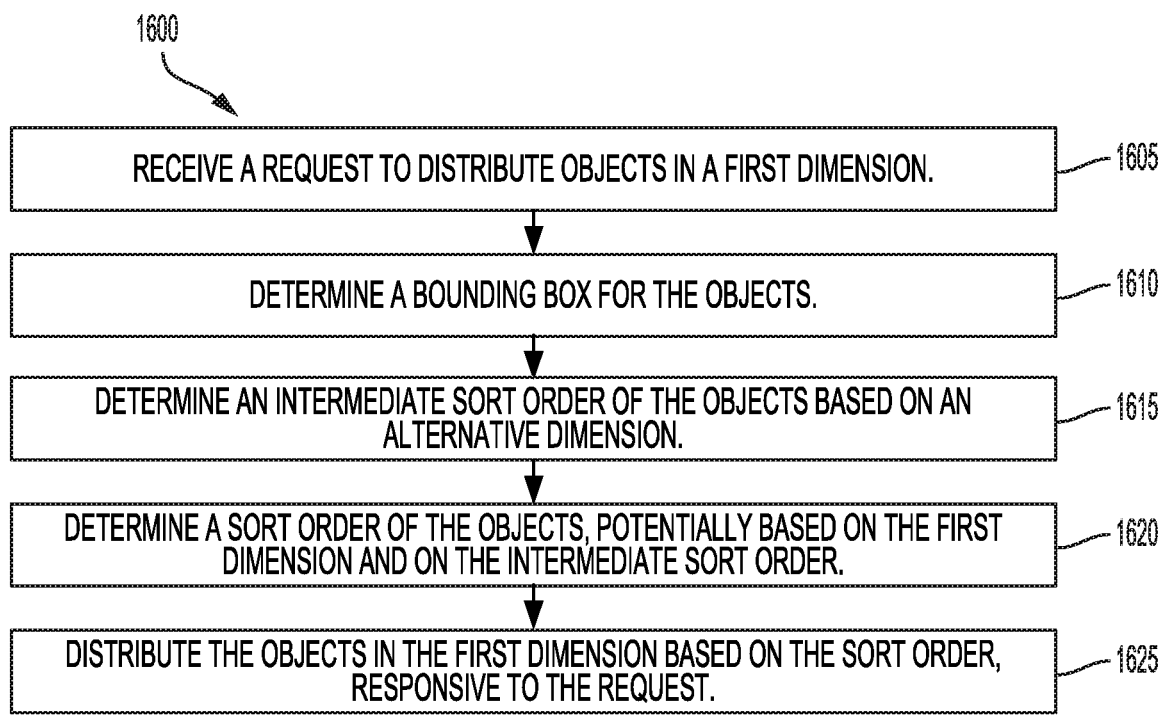
FIG. 16 depicts a process of distributing objects in a dimension when the placement of such objects does not indicate an ordering for the distribution, according to certain embodiments.

FIG. 16 depicts a process 1600 of distributing objects 195 in a dimension when the placement of such objects does not indicate an ordering for the distribution, according to certain embodiments. In other words, an embodiment of the widget-manipulation handler 150 utilizes this process 1600 or similar when distributing objects 195 in a dimension in which two or more objects 195 are aligned, e.g., in that the two or more objects 195 have a common position of minimum edges or centroids in that dimension.

At block 1605, the process 1600 involves receiving a request to distribute objects 195 in a first dimension. This request can take various forms. For example, if a user selects an axis handle corresponding to the first dimension, the widget-manipulation handler 150 maps this interaction to the positioning action of distributing the objects 195 throughout the first dimension.

At block 1610, the process 1600 involves determining a bounding box 302 for a set of objects 195. In one example, computing the bounding box 302 could be performed when generating a widget 190, such that the bounding box 302 is known upon receiving the request to distribute the objects 195. In that case, determining the bounding box 302 at block 1610 involves identifying the bounding box 302 that was previously computed and saved. In another example, however, the widget-manipulation handler 150 determines a bounding box 302 by computing, or re-computing, the bounding box 302 responsive to the request to distribute the objects 195.

At block 1615, the process 1600 involves determining an intermediate sort order by sorting the objects 195 in an alternative dimension, such as a second dimension, a third dimension, or both a second and a third dimension. At block 1620, the process 1600 involves further sorting the objects 195 in the first dimension to determine a sort order, while utilizing the intermediate sort order to break ties.

For instance, in one embodiment, the widget-manipulation handler 150 sorts the objects 195 according to their respective minimum edges in a second dimension to determine an intermediate sort order and then determines the sort order by further sorting the objects 195 according to their respective minimum edges in the first dimension. It will be understood that an object's minimum edge in the second dimension likely differs from that same object's minimum edge in the first dimension. For instance, given an example object 195 in at least two dimensions, the example object 195 has a minimum and a maximum edge in one dimension as well as minimum and maximum edge in another dimension. Additionally or alternatively, the widget-manipulation handler 150 could sort the objects 195 based on their centroids. Regardless of whether sorting utilizes minimum edges or centroids, the second sort could modify the first sort, resulting in a sort order that incorporates information from the second dimension as a tie breaker when objects 195 are aligned in the first dimension (i.e., the dimension in which the objects 195 are being distributed).

Another embodiment includes three sorts, specifically, a first sort in a third dimension, a second sort in a second dimension, and a third sort in the first dimension. In some embodiments, sorting in the first dimension is the last of these sorts; however, either the second dimension or the third dimension can be the subject of the first sort. For instance, between the second and third dimensions, the dimension in which the ordering of the objects 195 is deemed more important is used for the second sort, while the least important dimension is used for the first sort. In this manner, the sorting in the more important dimension overrides the sorting in the other dimension, and the sorting in the first dimension overrides the sorting in both other dimensions.

The resulting sort order incorporates information from one or more alternative dimensions (e.g., the second dimension and the third dimension) as a tie breaker when objects 195 are aligned in the first dimension. In some cases, as in the example of FIG. 12 and FIG. 13, such information from one or more alternative dimensions breaks the tie between objects 195 that are aligned in the first dimension. However, if the widget-manipulation handler 150 determines that two or more objects 195 are aligned in all dimensions, such that the sort order with respect to such two or more objects 195 indicates a tie between such two or more objects 195 despite utilizing an intermediate sort order, then an embodiment of the widget-manipulation handler 150 breaks the tie based on an established rule, such as based on a previously used sort order, based on the order in which the objects 195 were added to the layout view 185, or based on an arbitrary or random ordering. An example of such a case is illustrated in the example of FIG. 16 and FIG. 15.

At block 1625, the process 1600 involves distributing the objects 195 based on the sort order. Particularly, in some embodiments, the widget-manipulation handler 150 moves each object 195 as needed to distribute the objects 195 according to the sort order without changing the size or shape of such objects 195. For instance, after the distribution, the objects 195 are positioned in the first dimension such that the minimum edges of the objects 195, or the centroids of the objects 195, are distributed throughout the first dimension in the sort order. An example result of such a distribution is shown in FIG. 13, as discussed above.

Example Implementation

Figure 17:
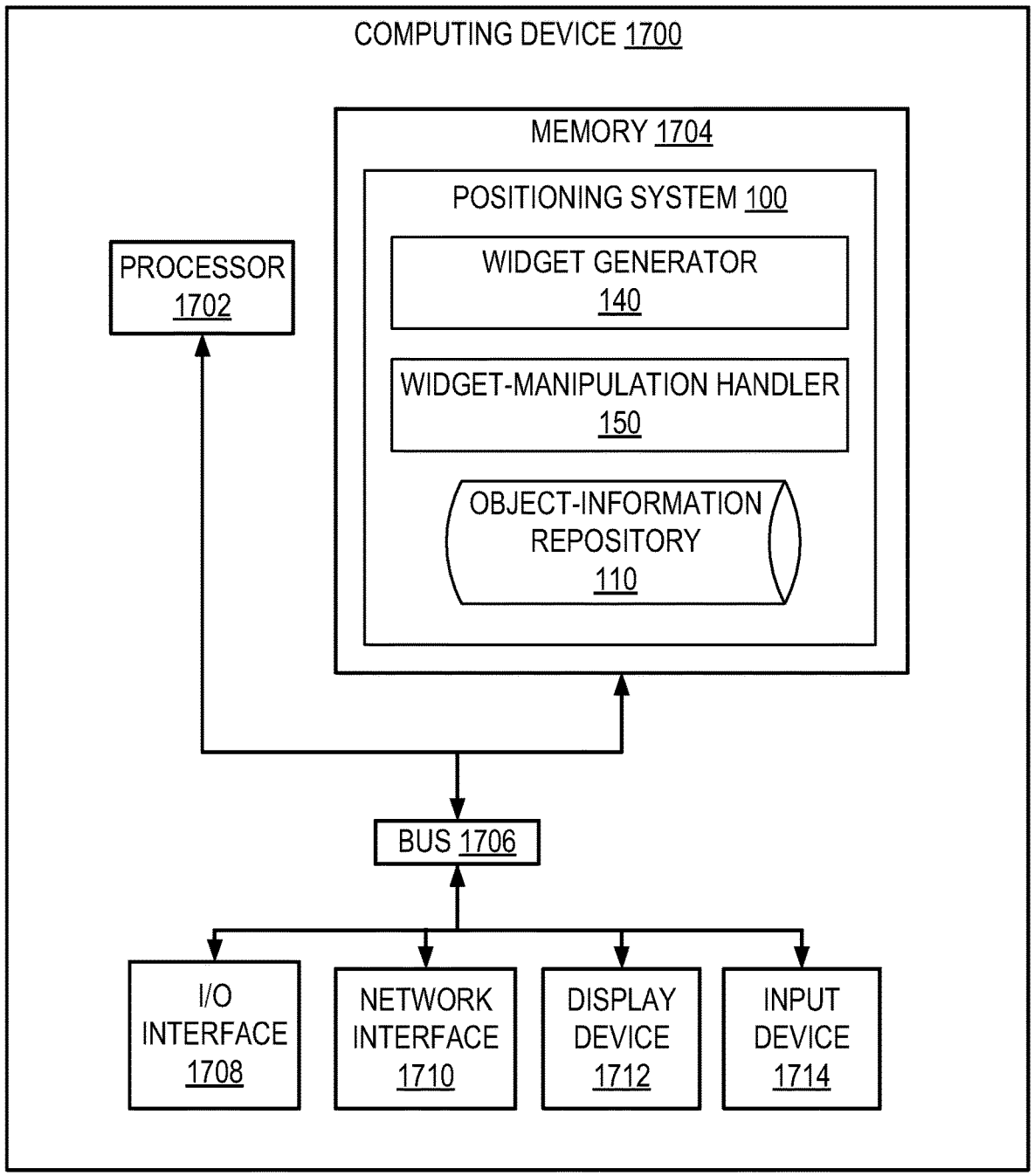
FIG. 17 depicts an example of a computing system that performs certain operations described herein, according to certain embodiments.

Any suitable computing system or group of computing systems can be used for performing the operations described herein. For example, FIG. 17 depicts an example of a computing device 1700 that executes the positioning system 100, including the widget generator 140 and the widget-manipulation handler 150. Computing device 1700 depicted in FIG. 17 may be used to implement various systems, subsystems, and servers described in this disclosure.

The depicted example of a computing device 1700 includes a processor 1702 communicatively coupled to one or more memory devices 1704. The processor 1702 executes computer-executable program code stored in a memory device 1704, accesses information stored in the memory device 1704, or both. Examples of the processor 1702 include a microprocessor, an application-specific integrated circuit (ASIC), a field-programmable gate array (FPGA), or any other suitable processing device. The processor 1702 can include any number of processing devices, including a single processing device.

The memory device 1704 includes any suitable non-transitory computer-readable medium for storing data, program code, or both. A computer-readable medium can include any electronic, optical, magnetic, or other storage device capable of providing a processor with computer-readable instructions or other program code. Non-limiting examples of a computer-readable medium include a magnetic disk, a memory chip, Read-Only Memory (ROM), Random-Access memory (RAM), an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, or ActionScript.

The computing device 1700 may also include a number of external or internal devices, such as input or output devices. For example, the Computing device 1700 is shown with one or more input/output (I/O) interfaces 1708. An I/O interface 1708 can receive input from input devices (e.g., input device 1714) or provide output to output devices (e.g., display device 1712). One or more buses 1706 are also included in the computing device 1700. The bus 1706 communicatively couples components together in the computing device 1700.

The computing device 1700 executes program code that configures the processor 1702 to perform one or more of the operations described herein. The program code may correspond to the widget generator 140 and the widget-manipulation handler 150 or other suitable applications that perform one or more operations described herein. The program code may be resident in the memory device 1704 or any suitable computer-readable medium and may be executed by the processor 1702 or any other suitable processor. In some embodiments, the widget generator 140 and the widget-manipulation handler 150 are stored in the memory device 1704, as depicted in FIG. 17. In additional or alternative embodiments, one or both of the widget generator 140 and the widget-manipulation handler 150 are accessible to the computing device 1700 but are stored in a different memory device of a different computing device. In additional or alternative embodiments, the program code described above is stored in one or more other memory devices accessible via a data network.

In some embodiments, one or more of the data sets, models, and functions utilizes by the positioning system 100 are stored in the same memory device (e.g., the memory device 1704). For example, the computing device 1700 could be the computing system 105 of FIG. 1 and could host the widget generator 140, the widget-manipulation handler 150, and the object-information repository 110. In additional or alternative embodiments, one or more of the programs, data sets, models, and functions described herein are stored in one or more other memory devices accessible via a data network. For instance, in one embodiment, the object-information repository 110 is stored locally to maintain object definitions, and the widget generator 140 and the widget-manipulation handler 150 are executed on a different computing device and access the object-information repository 110 over the data network. In another embodiment, the widget generator 140 and the widget-manipulation handler 150 are executed on different computing devices from each other.

The computing device 1700 also includes a network interface device 1710. The network interface device 1710 includes any device or group of devices suitable for establishing a wired or wireless data connection to one or more data networks. Non-limiting examples of the network interface device 1710 include an Ethernet network adapter, a modem, and the like. The computing device 1700 is able to communicate with one or more other computing devices via a data network using the network interface device 1710.

Figure 18:
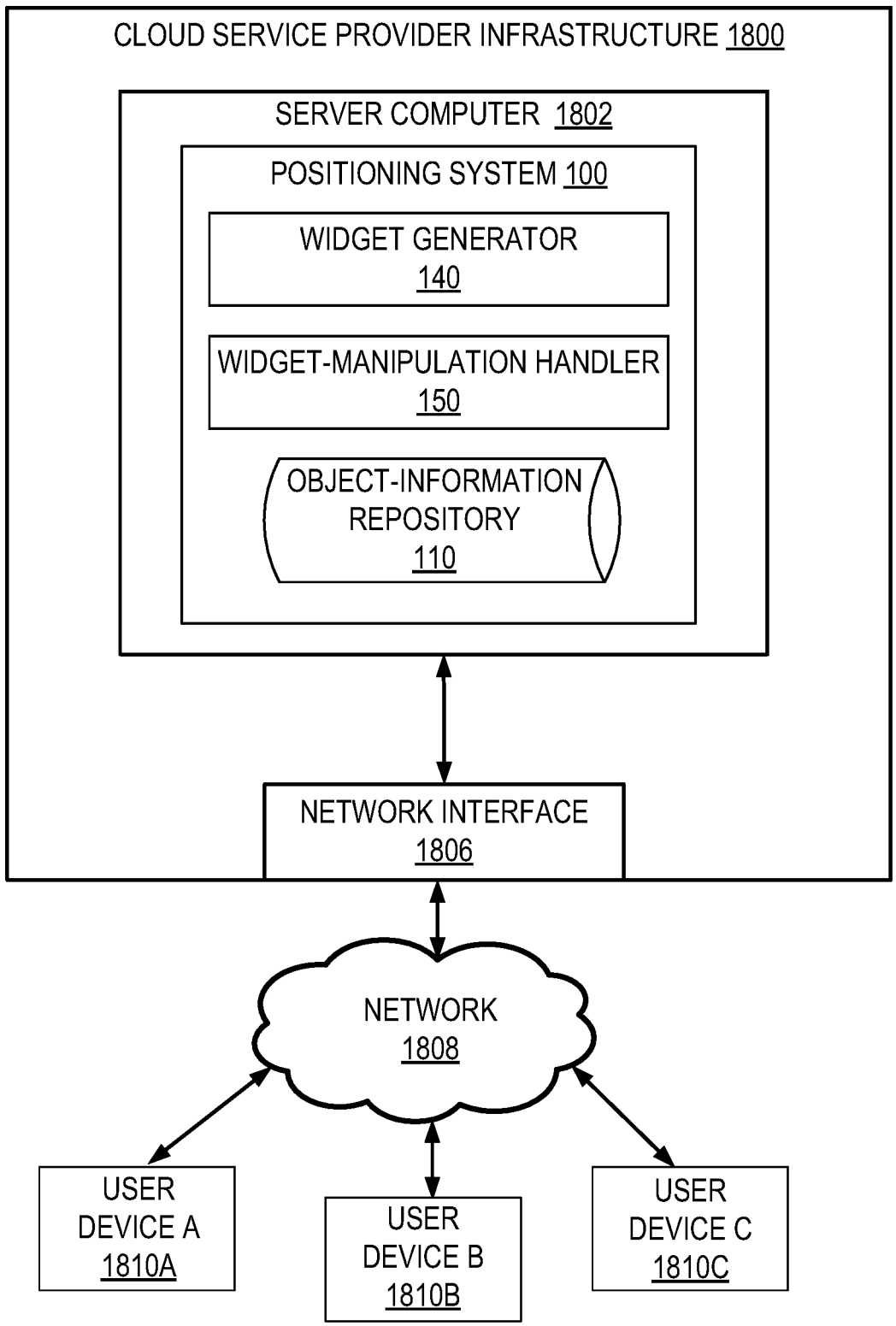
FIG. 18 depicts another example of a computing system that performs certain operations described herein, according to certain embodiments.

In some embodiments, the functionality provided by the computing device 1700 may be offered via a cloud-based service implemented as a cloud infrastructure 1800, also referred to as a cloud service provider infrastructure, provided by a cloud service provider. For example, FIG. 18 depicts an example of a cloud infrastructure 1800 offering one or more services including a service that offers widget generation and object positioning as described herein. The infrastructure may include one or more servers computers 1802 that implement such service, e.g., by running software or hardware. Such a service can be subscribed to and used by a number of user subscribers using user devices 1810A, 1810B, and 1810C (collectively 1810) across a network 1808. The service may be offered under a Software as a Service (SaaS) model, and one or more users may subscribe to such as service.

In the embodiment depicted in FIG. 18, the cloud infrastructure 1800 includes one or more server computers 1802 that are configured to perform processing to provide one or more services offered by the cloud service provider. One or more of server computers 1802 implement a widget generator 140 and a widget-manipulation handler 150 that provide functionalities similar to the widget generator 140 and the widget-manipulation handler 150 described herein and maintain an object-information repository 110 in which definitions of objects are stored. Additionally or alternatively, however, each user device 1810 maintains its own object-information repository 110. For example, a server computer 1802 executes software to implement the services and functionalities provided by the widget generator 140 and the widget-manipulation handler 150, where the software, when executed by one or more processors of the server computers 1802, causes provision of the services and functionalities described herein.

Program code or other instructions may be stored on any suitable non-transitory computer-readable medium such as any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, or ActionScript. In various examples, the server computers 1802 can include volatile memory, nonvolatile memory, or a combination thereof.

In the embodiment depicted in FIG. 18, the cloud infrastructure 1800 also includes a network interface device 1806 that enables communications to and from the cloud infrastructure 1800. In certain embodiments, the network interface device 1806 includes any device or group of devices suitable for establishing a wired or wireless data connection to the network 1808. Non-limiting examples of the network interface device 1806 include an Ethernet network adapter, a modem, or the like. The cloud infrastructure 1800 is able to communicate with the user devices 1810A, 1810B, and 1810C via the network 1808 using the network interface device 1806.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

What is claimed is:

1. A method in which one or more processing devices perform operations comprising:
    receiving a signal to display a widget;
    identifying one or more objects for which the widget is to be drawn, the one or more objects positioned in a three-dimensional (3D) virtual space;
    generating the widget, wherein generating the widget comprises:
        generating a first axis handle corresponding to a first dimension of the 3D virtual space;
        generating a first alignment handle connected to the first axis handle corresponding to the first dimension of the 3D virtual space, wherein the first alignment handle is oriented in a first alignment plane perpendicular to the first axis handle;
        generating a second alignment handle connected to the first axis handle corresponding to the first dimension of the 3D virtual space, wherein the second alignment handle is oriented in a second alignment plane perpendicular to the first axis handle;
        generating a second axis handle corresponding to a second dimension of the 3D virtual space, the second axis handle being perpendicular to the first axis handle;
        generating a third axis handle corresponding to a third dimension of the 3D virtual space, the third axis handle making a right angle with each of the first axis handle and the second axis handle; and
    causing the widget to be displayed by an output device along with the one or more objects.

2. The method of claim 1, the operations further comprising:
    detecting an interaction with the widget;
    determining, based on the interaction, a positioning action to be performed on a first object;
    applying the positioning action to the first object;
    determining an updated position of the first object as a result of applying the positioning action; and
    causing the first object to be displayed in the updated position.

3. The method of claim 1, the operations further comprising:
    detecting a selection of the first axis handle corresponding to the first dimension; and
    responsive to the selection of the first axis handle, evenly distributing the one or more objects in the first dimension.

4. The method of claim 1, the operations further comprising:
    detecting a selection of the first alignment handle; and
    responsive to the selection of the first alignment handle, aligning the one or more objects to a common value in the first dimension, the common value based on a position of the first alignment plane.

5. The method of claim 4, the operations further comprising:
    detecting a repositioning of the first alignment handle of the widget from an old position to a new position; and responsive to the repositioning of the first alignment handle, distributing the one or more objects in the first dimension, wherein each position of the one or more objects as a result of distributing the one or more objects is based on a difference between the new position and the old position, wherein a change in a position of a first object of the one or more objects as a result of distributing the one or more objects is based on a difference between a centroid of the first object and a centroid of a second object prior to distributing the one or more objects.

6. The method of claim 4, the operations further comprising:

detecting a repositioning of the first alignment handle of the widget from an old position to a new position; and responsive to the repositioning of the first alignment handle, distributing the one or more objects in the first dimension, wherein each position of the one or more objects as a result of distributing the one or more objects is based on a difference between the new position and the old position, wherein positions of the one or more objects as a result of distributing the one or more objects maintain a ratio of spacing between adjacent objects of the one or more objects.

7. The method of claim 1, wherein the second alignment plane is parallel to the first alignment plane.

8. The method of claim 7, the operations further comprising:

detecting a tentative selection of the first alignment handle by a user;

responsive to the tentative selection, highlighting an alignment section as a cross-section of the first alignment plane;

detecting a confirmed selection of the first alignment handle by the user; and responsive to the confirmed selection, aligning the one or more objects to the alignment section.

9. The method of claim 1, further comprising computing at least a portion of a 3D bounding box that encloses the one or more objects, wherein:

the second axis handle connects to the first axis handle at a first corner of a bottom plane of the 3D bounding box;

the third axis handle extends upward from the first axis handle at a second corner of the bottom plane of the 3D bounding box; and the first axis handle, the second axis handle, and the third axis handle define three dimensions of the 3D virtual space.

10. The method of claim 9, wherein:

the first corner at which the second axis handle connects to the first axis handle is closest, among lower corners of the 3D bounding box, to a virtual camera position; and the second corner at which the third axis handle connects to the first axis handle is second closest, among the lower corners of the 3D bounding box, to the virtual camera position.

11. A non-transitory computer-readable medium embodying program code for positioning objects in three-dimensional space, the program code comprising instructions that, when executed by a processor, cause the processor to perform operations comprising:

receiving a signal to display a widget;

identifying one or more objects for which the widget is to be drawn, the one or more objects positioned in a three-dimensional (3D) virtual space;

generating the widget, wherein generating the widget comprises:

generating a first axis handle corresponding to a first dimension of the 3D virtual space;

generating a first alignment handle connected to the first axis handle corresponding to the first dimension of the 3D virtual space, wherein the first alignment handle is oriented in a first alignment plane perpendicular to the first axis handle;

generating a second alignment handle connected to the first axis handle corresponding to the first dimension of the 3D virtual space, wherein the second alignment handle is oriented in a second alignment plane perpendicular to the first axis handle;

generating a second axis handle corresponding to a second dimension of the 3D virtual space, the second axis handle being perpendicular to the first axis handle;

generating a third axis handle corresponding to a third dimension of the 3D virtual space, the third axis handle making a right angle with each of the first axis handle and the second axis handle;

and causing the widget to be displayed by an output device along with the one or more objects.

12. The non-transitory computer-readable medium of claim 11, the operations further comprising:

detecting an interaction with the widget;

determining, based on the interaction, a positioning action to be performed on a first object;

applying the positioning action to the first object;

determining an updated position of the first object as a result of applying the positioning action; and causing the first object to be displayed in the updated position.

13. The non-transitory computer-readable medium of claim 11, the operations further comprising:

detecting a selection of the first alignment handle;

responsive to the selection of the first alignment handle, aligning the one or more objects to a common value in the first dimension, the common value based on a position of the first alignment plane.

14. The non-transitory computer-readable medium of claim 11, the operations further comprising:

detecting a repositioning of the first alignment handle of the widget from an old position to a new position, and the operations further comprising:

responsive to the repositioning of the first alignment handle, distributing the one or more objects in the first dimension, wherein each position of the one or more objects as a result of distributing the one or more objects is based on a difference between the new position and the old position, wherein a change in a position of a first object of the one or more objects as a result of distributing the one or more objects is based on a difference between a centroid of the first object and a centroid of a second object prior to distributing the one or more objects.

15. The non-transitory computer-readable medium of claim 11, the operations further comprising:

detecting a repositioning of the first alignment handle of the widget from an old position to a new position, and the operations further comprising:

responsive to the repositioning of the first alignment handle, distributing the one or more objects in the first dimension, wherein each position of the one or more objects as a result of distributing the one or more objects is based on a difference between the new position and the old position, wherein positions of the one or more objects as a result of distributing the one or more objects maintain a ratio of spacing between adjacent objects of the one or more objects.

16. A method in which one or more processing devices perform operations comprising:

generating two or more objects positioned in a three-dimensional (3D) virtual space, the two or more objects being aligned by sharing a common value in a first dimension of the 3D virtual space;

determining a 3D bounding box for the two or more objects, wherein the 3D bounding box has an initial length in the first dimension in which the common value is shared;

receiving a user request from a user to increase the length of the 3D bounding box in the first dimension in which the common value is shared;

determining a sort order for the two or more objects, wherein the sort order is associated with the first dimension and based on an order of the objects in a second dimension other than the first dimension;

responsive to the user request to increase the length of the 3D bounding box to an updated length in the first dimension in which the common value is shared, redistributing the two or more objects according to the sort order in the first dimension along the updated length of the 3D bounding box such that the two or more objects no longer share the common value in the first dimension; and causing the two or more objects to be displayed by an output device.

17. The method of claim 16, wherein the 3D bounding box comprises a bottom section having a set of corners, and the operations further comprising:

determining, from among the set of corners, a closest corner to a virtual camera position, wherein a view of the two or more objects is from a perspective of the virtual camera position;

determining, from among the set of corners, a second closest corner to the virtual camera position;

generating a widget comprising:

a first axis handle and a second axis handle connecting at the closest corner, the first axis handle corresponding to a first dimension of the 3D virtual space and the second axis handle corresponding to a second dimension of the 3D virtual space; and the first axis handle and a third axis handle connecting at the second closest corner, the third axis handle corresponding to a third dimension of the 3D virtual space; and causing the widget to be displayed by the output device along with the two or more objects.

18. The method of claim 16, wherein the common value is shared among respective coordinates of centroids of the two or more objects.

19. The method of claim 16, wherein the common value is shared among respective coordinates of edges of the two or more objects.

* * * * *